United States Patent
Huang

(10) Patent No.: US 9,937,624 B2
(45) Date of Patent: Apr. 10, 2018

(54) MECHANISM-PARAMETER-CALIBRATION METHOD FOR ROBOTIC ARM SYSTEM

(71) Applicant: Delta Electronics, Inc., Taoyuan (TW)

(72) Inventor: Cheng-Hao Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 65 days.

(21) Appl. No.: 15/213,736

(22) Filed: Jul. 19, 2016

(65) Prior Publication Data

US 2017/0291302 A1    Oct. 12, 2017

(30) Foreign Application Priority Data

Apr. 8, 2016   (TW) .............................. 105111016 A

(51) Int. Cl.
  *B25J 9/16*    (2006.01)
(52) U.S. Cl.
  CPC ............ B25J 9/1692 (2013.01); *Y10S 901/09* (2013.01); *Y10S 901/46* (2013.01)
(58) Field of Classification Search
  CPC ...... B25J 9/1692; Y10S 901/46; Y10S 901/09
  See application file for complete search history.

(56) References Cited

U.S. PATENT DOCUMENTS

| | | | | |
|---|---|---|---|---|
| 6,317,699 B1* | 11/2001 | Watanabe | ............... | B25J 9/1692 700/254 |
| 6,408,252 B1* | 6/2002 | De Smet | ................ | B25J 9/1692 700/254 |
| 2004/0010345 A1* | 1/2004 | Kim | ....................... | B25J 9/1692 700/254 |
| 2015/0158181 A1* | 6/2015 | Kawamura | ............ | B25J 9/1697 700/259 |

\* cited by examiner

*Primary Examiner* — Khoi H Tran
*Assistant Examiner* — Robert T Nguyen
(74) *Attorney, Agent, or Firm* — Muncy, Geissler, Olds & Lowe, P.C.

(57) ABSTRACT

A mechanism-parametric-calibration method for a robotic arm system is provided. The method includes controlling the robotic arm to perform a plurality of actions so that one end of the robotic arm moves toward corresponding predictive positioning-points; determining a predictive relative-displacement between each two of the predictive positioning-points; after the robotic arm performs each of the actions, sensing three-dimensional positioning information of the end of the robotic arm; determining, according to the three-dimensional positioning information, a measured relative-displacement moved by the end of the robotic arm when the robotic arm performs each two of the actions; deriving an equation corresponding to the robotic arm from the predictive relative-displacements and the measured relative-displacements; and utilizing a feasible algorithm to find the solution of the equation.

12 Claims, 12 Drawing Sheets

MECHANISM-PARAMETER-CALIBRATION METHOD FOR ROBOTIC ARM SYSTEM

CROSS REFERENCE TO RELATED APPLICATION

The present application is based on, and claims priority from, Taiwan Application Number TW 105111016, filed on Apr. 8, 2016, the invention of which is hereby incorporated by reference herein in its entirety.

TECHNICAL FIELD

The disclosure relates to a robotic arm system, and more particularly to calibrating the robotic arm system by measured relative-displacement.

BACKGROUND

The mechanical structure of a robotic arm system is quite complicated. In analysis of robot kinematics, the mechanical structure is generalized and described as a mechanism parameter set including size (arm length) of mechanical links, connection orientations and angles between joint axes, joint variables, and other geometric variables. The mechanism parameter set is further used to construct a mathematical model for calculating spatial positions of the robotic arm. In other words, according to values of the mechanism parameter set, predictive positioning-points of the robotic arm in space can be calculated by mathematical model.

Hence an ideal mathematical model of the robotic arm can be a function equation F(S) corresponding to a mechanism parameter set S for calculating predictive positioning-points P of the mathematical model of the robotic arm in space. An expression equation is shown below:

$$P = F(S)$$

Wherein the mechanism parameter set S includes the size (arm length) of mechanical links, the connection orientations and angles between joint axes, the amount of joint variables, and other geometric variables.

However, in some situations, the actual values of the mechanism parameter set S are different from the ideal values due to influence from factors such as machining tolerances of mechanical components, mechanism assembly error, mechanism transmission error, load stress variation, operation abrasion, and ambient temperature changes. Accordingly, the default values of the mechanism parameter set S tend to have errors such as position deviation $\Delta P$ between the actual measured positioning-point N and the predictive positioning-point P of the mathematical model. The position deviation $\Delta P$ represents the performance of the robotic arm in terms of positioning accuracy and efficiency, and it also reflects a margin of deviation corresponding to the mechanism parameter set S.

Deviations of every parameter in the mechanism parameter set S are supposed to be a set of mechanism parametric deviations $\Delta S$. The set of mechanism parametric deviations $\Delta S$ and the position deviation $\Delta P$ are further assumed to have a slight deviation in their linear relationship, as shown below:

$$\Delta P = N - P = J(S) \cdot \Delta S$$

Wherein the coefficient matrix $$J(S) = \frac{\partial F(S)}{\partial S}$$

is a partial differential matrix deriving from the mathematical model F(S) over the mechanism parameter set S.

FIG. 1 is a schematic diagram showing a robotic arm system 10. The robotic arm system 10 comprises a robotic arm 11, a base 12, a storage unit 13, a processing unit 14 and an absolute positioning measuring instrument 15. The robotic arm 11 is disposed on the base 12 and electrically connected to the processing unit 14. The storage unit 13 is used to store a plurality of mechanism parameter sets $S_k$, k=1, . . . , n ($S_1 \sim S_n$) and a corresponding plurality of predictive positioning-points $P_k$, k=1, . . . , n ($P_1 \sim P_n$). The predictive positioning-point $P_k$ is calculated by substituting the mechanism parameter set $S_k$ into the ideal mathematical model F(S) of the robotic arm 11, and is represented below:

$$P_k = F(S_k), k=1, \ldots, n$$

Wherein the mechanism parameter sets $S_1 \sim S_n$, are the size (arm length) of mechanical links, the connection orientations and angles between joint axes, the amount of joint variables, and other geometric variables of the robotic arm 11.

The processing unit 14 comprises a calibrating calculation unit 141 and a control unit 142. The processing unit 14 is electrically connected to the storage unit 13. The control unit 142 of the processing unit 14 performs a specific action according to a specific mechanism parameter set S (e.g. $S_k$), so an end of the robotic arm 11 moves toward a predictive positioning-point P (e.g. $P_k$) corresponding to the specific mechanism parameter set S.

The absolute positioning measuring instrument 15 can be a coordinate-measuring machine (CMM) or a laser tracker. The absolute positioning measuring instrument 15 is used to perform an absolute positioning measurement on multiple positioning points of the end of the robotic arm 11 such as an end-effector. When the end of the robotic arm 11 moves toward a predictive positioning-point P (e.g. $P_k$), the absolute positioning measuring instrument 15 obtains a corresponding absolute measured positioning point N (e.g. $N_k$, k=1, . . . , n).

At this moment, distinct absolute measured positioning points $N_k$ and distinct predictive positioning-points $P_k$ corresponding to n positioning points are repeatedly measured and collected to obtain a linear relationship of the predictive positioning-points $P_k$ and the mechanism parametric deviations $\Delta S$. The linear relationship is shown below:

$$\Delta P_k = N_k - P_k = J(S_k) \cdot \Delta S, k=1,2,\ldots,n$$

According to the above linear relationship derived from enough amounts of positioning points are measured and collected, an optimization equation $\Phi$ of the robotic arm 11 is obtained and represented below:

$$\Phi = \min_{\Delta S} \sum_{k=1}^{n} (\Delta P_k - J(S_k) \cdot \Delta S)^2$$

Then the processing unit 14 of the robotic arm system 10 utilizes an optimization algorithm and the optimization equation $\Phi$ to obtain a set of mechanism parametric deviations $\Delta S$. Finally, the processing unit 14 of the robotic arm system 10 accomplishes calibration by using the set of mechanism parametric deviations ΔS to calibrate the mechanism parameter sets $S_1 \sim S_n$ of the robotic arm 11.

However, the set of mechanism parametric deviations ΔS and the position deviation ΔP are assumed to have a slight deviation in their linear relationship based on approximating the position deviations of a non-linear mathematical model of the robotic arm by a partial differential equation. The approximation method is more effective for small position deviations ΔP. If the position deviations ΔP are too large, the approximation errors would reduce the efficiency of obtaining the set of mechanism parametric deviations ΔS with the optimization equation Φ. In addition, an absolute positioning measuring instrument 15 is required to serve as precision measuring equipment which can perform absolute positioning measurements. An example is the laser tracker. Absolute positioning measuring instruments 15 are expensive and are not easy to be implemented on site in factories.

In view of this, the present application provides a mechanism-parametric-calibration method, wherein calibration measurement embodiments and algorithms are illustrated to obtain a corresponding calculation result for adjusting mechanism parameters of the robotic arm. Accordingly, the accuracy of positioning the robotic arm is improved thereby.

SUMMARY

Accordingly, the main purpose of the present disclosure is to provide a mechanism-parametric-calibration method to improve upon the disadvantages of the prior art.

An embodiment of the present disclosure provides a mechanism-parametric-calibration method for a robotic arm system. The robotic arm system comprises a robotic arm and a measuring instrument. The mechanism-parametric-calibration method comprises controlling, according to n mechanism parameter sets, the robotic arm performing n actions so that the end of the robotic arm moves toward n corresponding predictive positioning-points; determining a predictive relative-displacement equation of each two of the n predictive positioning-points; sensing, using the measuring instrument, three-dimensional measured positioning-points corresponding to the end of the robotic arm after the robotic arm performs each of the n actions; determining, according to the n three-dimensional measured positioning-points, a measured relative-displacement moved by the end of the robotic arm when the robotic arm performs each two of the n actions; deriving an optimization equation corresponding to the robotic arm from the predictive relative-displacement equations and the measured relative-displacements; obtaining, by the optimization equation, a set of mechanism parametric deviations of the robotic arm; and calibrating, by the set of mechanism parametric deviations, the n mechanism parameter sets of the robotic arm.

An embodiment of the present disclosure provides a mechanism-parametric-calibration method for a robotic arm system. The robotic arm system comprises a robotic arm, a calibration block and a measuring instrument. The mechanism-parametric-calibration method comprises controlling, according to nx mechanism parameter sets corresponding to nx first-direction predictive positioning-points, the robotic arm performing nx actions so that the end of the robotic arm moves toward the nx first-direction predictive positioning-points which are in front of a first precision plane of the calibration block; sensing, using the measuring instrument, a first-direction measured displacement between the first precision plane and the end of the robotic arm when the robotic arm performs each of the nx actions; determining, according to the nx first-direction measured displacement, a first-direction measured relative-displacement moved by the end of the robotic arm when the robotic arm performs each two of the nx actions; determining a first-direction predictive relative-displacement equation of each two of the nx first-direction predictive positioning-points; deriving an optimization equation corresponding to the robotic arm from the first-direction predictive relative-displacement equations and the first-direction measured relative-displacements; obtaining, by the optimization equation, a set of mechanism parametric deviations of the robotic arm; and calibrating, by the set of mechanism parametric deviations, the nx mechanism parameter sets corresponding to the nx first-direction predictive positioning-points of the robotic arm.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims Terms used in this disclosure:

P~predictive positioning-point of the mathematical model

S~mechanism parameter set

N~absolute measured positioning-point

ΔP~position deviation

Figure 2:
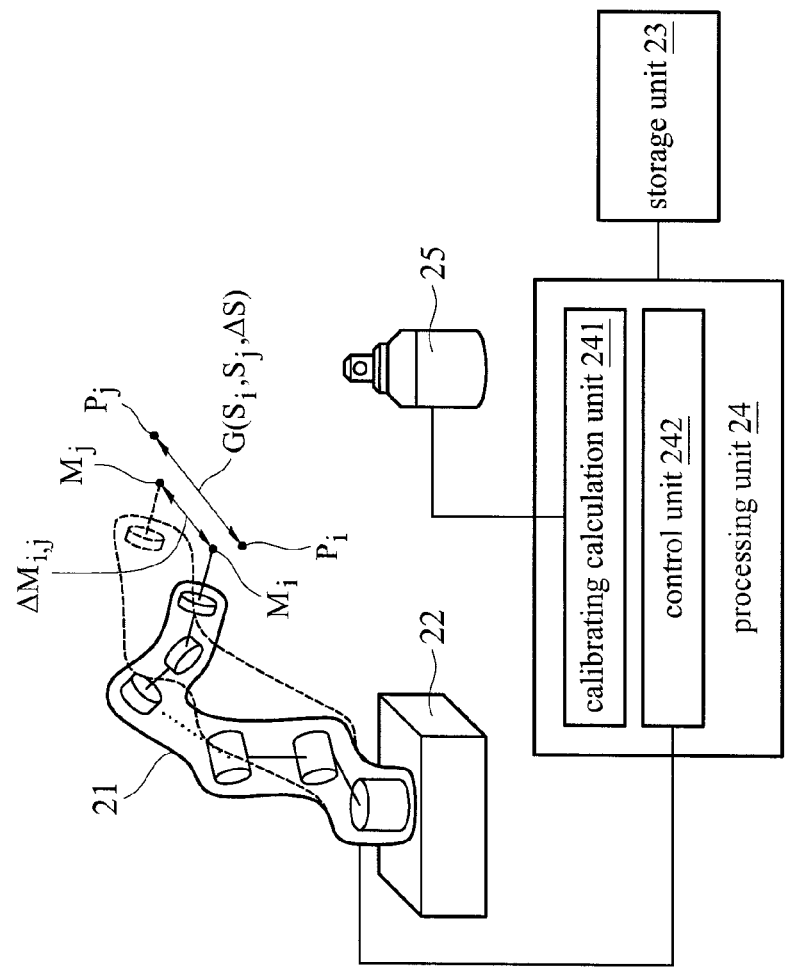
FIG. 2 is a system configuration diagram of a robotic arm system 20 according to an embodiment of the present disclosure.

ΔS~set of mechanism parametric deviations $P_k$, k=1, . . . , n~predictive positioning-points $S_k$, k=1, . . . , n~mechanism parameter sets corresponding to the predictive positioning-points $\Delta P_{i,j}$, i=1, . . . , n−1, j=i+1, . . . , n~predictive relative-displacement $M_k$, k=1, . . . , n~three-dimensional measured positioning-point $\Delta M_{i,j}$, i=1, . . . , n−1, j=i+1, . . . , n~measured relative-displacement $G(S_i, S_j, \Delta S)$~predictive relative-displacement equation $g_x(S_i, S_j, \Delta S)$~first-direction predictive relative-displacement equation $g_y(S_i, S_j, \Delta S)$~second-direction predictive relative-displacement equation $g_z(S_i, S_j, \Delta S)$~third-direction predictive relative-displacement $xS_k$, k=1, . . . , nx~mechanism parameter sets corresponding to the first-direction predictive positioning-points $yS_k$, k=1, . . . , ny~mechanism parameter sets corresponding to the second-direction predictive positioning-points $zS_k$, k=1, . . . , nz~mechanism parameter sets corresponding to the third-direction predictive positioning-points $xP_k$, k=1, . . . , nx~first-direction predictive positioning-points $yP_k$, k=1, . . . , ny~second-direction predictive positioning-points $zP_k$, k=1, . . . , nz~third-direction predictive positioning-points $\Delta xP_{i,j}$, i=1, . . . , nx−1, j=i+1, . . . , nx~first-direction predictive relative-displacement $\Delta yP_{i,j}$, i=1, . . . , ny−1, j=i+1, y−1, ~second-direction predictive relative-displacement $\Delta zP_{i,j}$, i=1, . . . , nz−1, j=i+1, z−1, ~third-direction predictive relative-displacement $G(xS_i, xS_j, \Delta S)$~three-dimensional predictive relative displacement equation corresponding to the first-direction predictive positioning-points $g_x(xS_i, xS_j, \Delta S)$~first-direction predictive relative-displacement equations corresponding to the first-direction predictive positioning-points $g_y(xS_i, xS_j, \Delta S)$~second direction predictive relative-displacement equations corresponding to the first-direction predictive positioning-points $g_z(xS_i, xS_j, \Delta S)$~third direction predictive relative-displacement equations corresponding to the first-direction predictive positioning-points $G(yS_i, yS_j, \Delta S)$~three-dimensional predictive relative-displacement equation corresponding to the second-direction predictive positioning-points $g_x(yS_i, yS_j, \Delta S)$~first-direction predictive relative-displacement equations corresponding to the second-direction predictive positioning-points $g_y(yS_i, yS_j, \Delta S)$~second-direction predictive relative-displacement equations corresponding to the second-direction predictive positioning-points $g_z(yS_i, yS_j, \Delta S)$~third-direction predictive relative-displacement equations corresponding to the second-direction predictive positioning-points $G(zS_i, zS_j, \Delta S)$~three-dimensional predictive relative-displacement equation corresponding to the third-direction predictive positioning-points $g_x(zS_i, zS_j, \Delta S)$~first-direction predictive relative-displacement equations corresponding to the third-direction predictive positioning-points $g_y(zS_i, zS_j, \Delta S)$~second-direction predictive relative-displacement equations corresponding to the third-direction predictive positioning-points $g_z(zS_i, zS_j, \Delta S)$~third-direction predictive relative-displacement equations corresponding to the third-direction predictive positioning-points $\Delta xMx_{i,j}$, i=1, . . . , nx−1, j=i+1, . . . , nx~first-direction measured relative-displacement corresponding to the first-direction predictive positioning-points $xP_i$ and $xP_j$ $\Delta yMy_{i,j}$, i=1, . . . , ny−1, j=i+1, . . . , ny~second-direction measured relative-displacements corresponding to the second-direction predictive positioning-points $yP_i$ and $yP_j$ $\Delta zMz_{i,j}$, i=1, . . . , nz−1, j=i+1, . . . , nz~third-direction measured relative-displacements corresponding to the second-direction predictive positioning-points $zP_i$ and $zP_j$ $xMx_k$, k=1, . . . , nx~first-direction measured displacement $yMy_k$, k=1, . . . , ny~second-direction measured displacement $zMz_k$, k=1, . . . , nz~third-direction measured displacement Dx,Dy,Dz~first-direction displacement parameter, second-direction displacement parameter, third-direction displacement parameter FIG. 2 is a system configuration diagram of a robotic arm system 20 according to an embodiment of the present disclosure. In FIG. 2, the robotic arm system 20 comprises a robotic arm 21, a base 22, a storage unit 23, a processing unit 24 and a measuring instrument 25. The robotic arm 21 is disposed on the base 22 and electrically connected to the processing unit 24.

In FIG. 2, assuming a calibrated mathematical model of the robotic arm 21 is represented below:

$$P=F(S+\Delta S)$$

Wherein the mechanism parameter set S is, but not limited thereto, a set of the size (arm length) of mechanical links, the connection orientations and angles between joint axes, the amount of joint variables, and other geometric variables of the robotic arm 21, and the set of mechanism parametric deviations ΔS is prepared for compensating for the mechanism parameter set S after calibration.

In FIG. 2, the storage unit 23 is used to store a plurality of mechanism parameter sets $S_k$, k=1, . . . , n ($S_1$~$S_n$). Corresponding predictive positioning-points $P_k$, k=1, . . . , n ($P_1$~$P_n$) are obtained by substituting the mechanism parameter set $S_k$ into the calibrated mathematical model F(S+ΔS) of the robotic arm 21 and can be represented below:

$$P_k=F(S_k+\Delta S), k=1, \ldots, n$$

Wherein the mechanism parameter sets $S_1$~$S_n$ comprise the size (arm length) of mechanical links, the connection orientations and angles between joint axes, the amount of joint variables, and other geometric variables.

In FIG. 2, the processing unit 24 comprises a calibrating calculation unit 241 and a control unit 242. The processing unit 24 is electrically connected to the storage unit 23. The control unit 242 of the processing unit 24 controls the robotic arm 21 performing a plurality of actions so that an end of the robotic arm 21 moves toward corresponding predictive positioning-points $P_1$~$P_n$. E.g. the control unit 242 of the processing unit 24 performs an action according to a specific mechanism parameter set $S_k$ so the end of the robotic arm 21 moves toward a specific corresponding predictive positioning-point $P_k$. In FIG. 2, the calibrating calculation unit 241 of the processing unit 24 further determines a predictive relative-displacement $\Delta P_{i,j}$ which is between each two of the predictive positioning-points $P_1 \sim P_n$.

In FIG. 2, the two predictive positioning-points $P_i$ and $P_j$ are respectively represented as $P_i \equiv F(S_i + \Delta S)$ and $P_j \equiv F(S_j + \Delta S)$, and a predictive relative-displacement equation $G(S_i, S_j, \Delta S)$ between the two predictive positioning-points $P_i$ and $P_j$ is represented below:

$$\Delta P_{i,j} = P_j - P_i$$
$$= F(S_j + \Delta S) - F(S_i + \Delta S)$$
$$= G(S_i, S_j, \Delta S),$$
$$i = 1, \ldots, n-1, j = i+1, \ldots, n$$

In FIG. 2, the measuring instrument 25 is electrically connected to the processing unit 24. The measuring instrument 25 is used to measure three-dimensional positioning information corresponding to the end of the robotic arm 21 while the robotic arm 21 performing each of the actions. The calibrating calculation unit 241 of the processing unit 24 determines, according to the three-dimensional positioning information, a measured relative-displacement $\Delta M_{i,j}$ moved by the end of the robotic arm 21 while performing each two of the actions. Then the calibrating calculation unit 241 of the processing unit 24 obtains an optimization equation $\Phi$ corresponding to the robotic arm 21 according to the predictive relative-displacement equations $G(S_i, S_j, \Delta S)$ and the measured relative-displacements $\Delta M_{i,j}$.

In FIG. 2, the measuring instrument 25 measures three-dimensional measured positioning-points $M_k$, k=1, ..., n ($M_1 \sim M_n$) corresponding to the end of the robotic arm 21 while the robotic arm 21 performing each of the actions. The calibrating calculation unit 241 of the processing unit 24 determines the measured relative-displacement $\Delta M_{i,j}$ between each two of the three-dimensional measured positioning-points $M_1 \sim M_n$. In FIG. 2, the measured relative-displacement $\Delta M_{i,j}$ corresponding to two predictive positioning-points $P_i$ and $P_j$ is represented below:

$$\Delta M_{i,j} = M_j - M_i, i=1, j=i+1, \ldots, n$$

That is, the three-dimensional positioning information includes the three-dimensional measured positioning-points $M_1 \sim M_n$ and the measured relative-displacements $\Delta M_{i,j}$.

In FIG. 2, the measuring instrument 25 can be a coordinate-measuring machine or a laser tracker which performs spatial positioning measurement. Because the processing unit 24 only requires the measured relative-displacement $\Delta M_{i,j}$ corresponding to two predictive positioning-points $P_i$ and $P_j$, the choices of the measuring instrument 25 are not limited to an absolute positioning measuring instrument. The measuring instrument 25 can also be a contact instrument or a non-contact instrument which performs spatial positioning measurements.

Then the calibrating calculation unit 241 of the processing unit 24 calculates the optimization equation $\Phi$ corresponding to the robotic arm 21 according to the predictive relative-displacement equations $G(S_i, S_j, \Delta S)$ and the measured relative-displacements $\Delta M_{i,j}$ and the optimization equation $\Phi$ is represented below:

$$\Phi = \min_{\Delta S} \sum_{i=1}^{n-1} \sum_{j=i+1}^{n} (\Delta M_{i,j} - G(S_i, S_j, \Delta S))^2$$

Then the processing unit 24 of the robotic arm system 20 utilizes an optimization algorithm and the optimization equation $\Phi$ to obtain a set of mechanism parametric deviations $\Delta S$. Finally, the processing unit 24 of the robotic arm system 20 uses the set of mechanism parametric deviations $\Delta S$ to calibrate the mechanism parameter sets $S_1 \sim S_n$ of the robotic arm 21.

It should be noted that, among the choices of the optimization algorithm of the robotic arm system 20, the processing unit 24 can be adopted an optimization algorithm with a non-linear equation. Because the predictive relative-displacement equation $G(S_i, S_j, \Delta S)$ used for calculating the predictive relative-displacement $\Delta P_{i,j}$ of the robotic arm 21 is almost equivalent to the robot non-linear mathematical model, the approximation error of the predictive relative-displacement equation $G(S_i, S_j, \Delta S)$ is extremely small. Accordingly, the optimization convergence effect of the set of mechanism parametric deviations $\Delta S$ obtained by the optimization equation $\Phi$ of the robotic arm system 20 is greater than the optimization convergence effect of the set of mechanism parametric deviations $\Delta S$ obtained by the optimization equation $\Phi$ of the robotic arm system 10.

Figure 3:
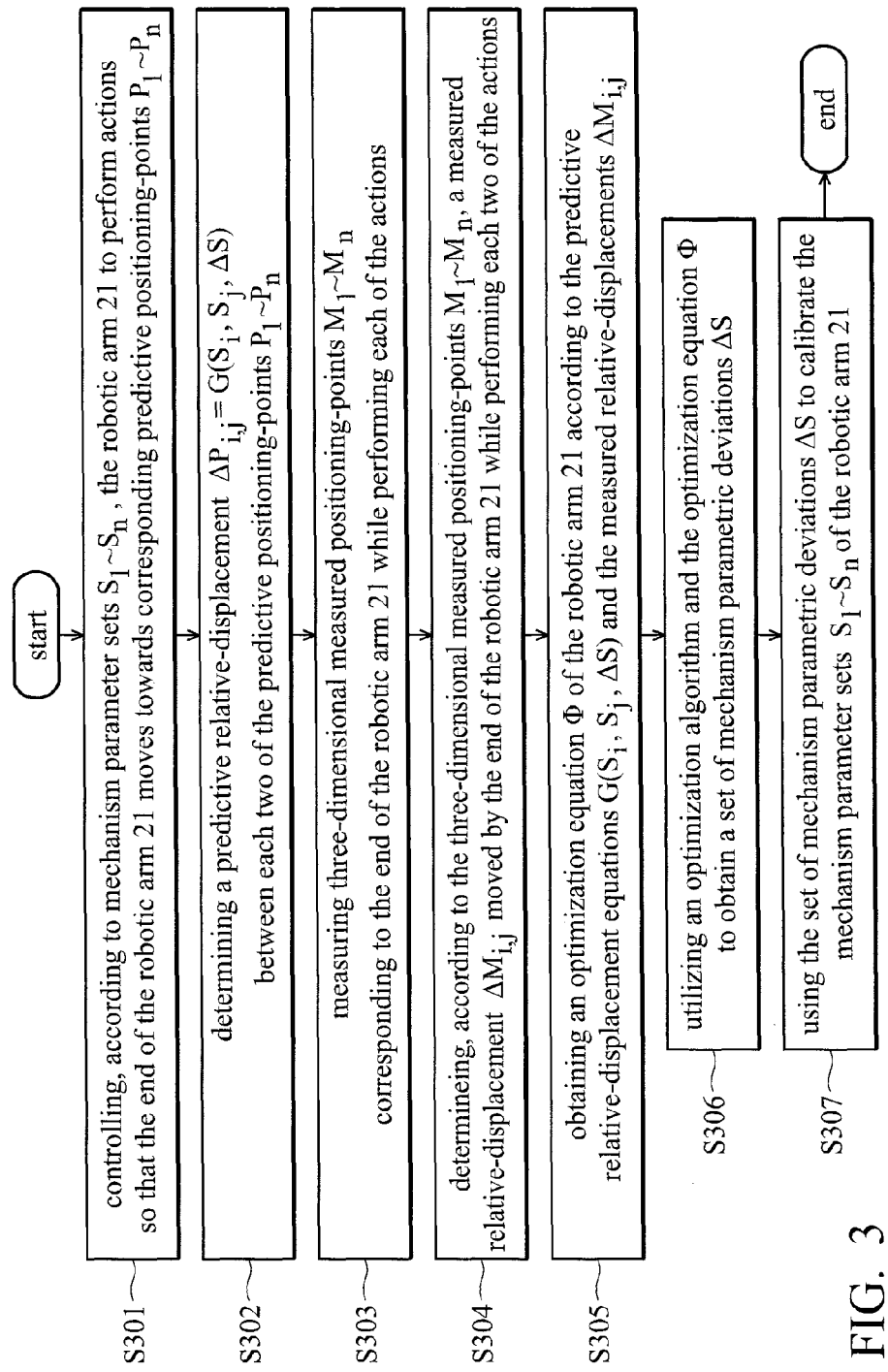
FIG. 3 shows a flow diagram illustrating a mechanism-parametric-calibration method for the robotic arm system 20.

FIG. 3 shows a flow diagram illustrating a mechanism-parametric-calibration method for the robotic arm system 20. In step S301, the processing unit 24 of the robotic arm system 20 controls, according to a plurality of mechanism parameter sets $S_k$, k=1, ..., n ($S_1 \sim S_n$), the robotic arm 21 to perform a plurality of actions so that the end of the robotic arm 21 moves toward a plurality of corresponding predictive positioning-points $P_1 \sim P_n$. In step S302, the processing unit 24 of the robotic arm system 20 determines a predictive relative-displacement $\Delta P_{i,j} = G(S_i, S_j, \Delta S)$ between each two of the predictive positioning-points $P_1 \sim P_n$. In step S303, the measuring instrument 25 measures three-dimensional measured positioning-points $M_k$, k=1, ..., n ($M_1 \sim M_n$) corresponding to the end of the robotic arm 21 while the robotic arm 21 performing each of the actions. In step S304, the processing unit 24 of the robotic arm system 20 determines, according to the three-dimensional measured positioning-points $M_1 \sim M_n$, a measured relative-displacement $\Delta M_{i,j}$ moved by the end of the robotic arm 21 while the robotic arm 21 performing each two of the actions. In step S305, the processing unit 24 of the robotic arm system 20 obtains an optimization equation $\Phi$ corresponding to the robotic arm 21 according to the predictive relative-displacement equations $G(S_i, S_j, \Delta S)$ and the measured relative-displacements $\Delta M_{i,j}$. In step S306, the processing unit 24 of the robotic arm system 20 utilizes an optimization algorithm and the optimization equation $\Phi$ to obtain a set of mechanism parametric deviations $\Delta S$. In step S307, the processing unit 24 of the robotic arm system 20 uses the set of mechanism parametric deviations $\Delta S$ to calibrate the mechanism parameter sets $S_1 \sim S_n$ of the robotic arm 21.

Figure 4:
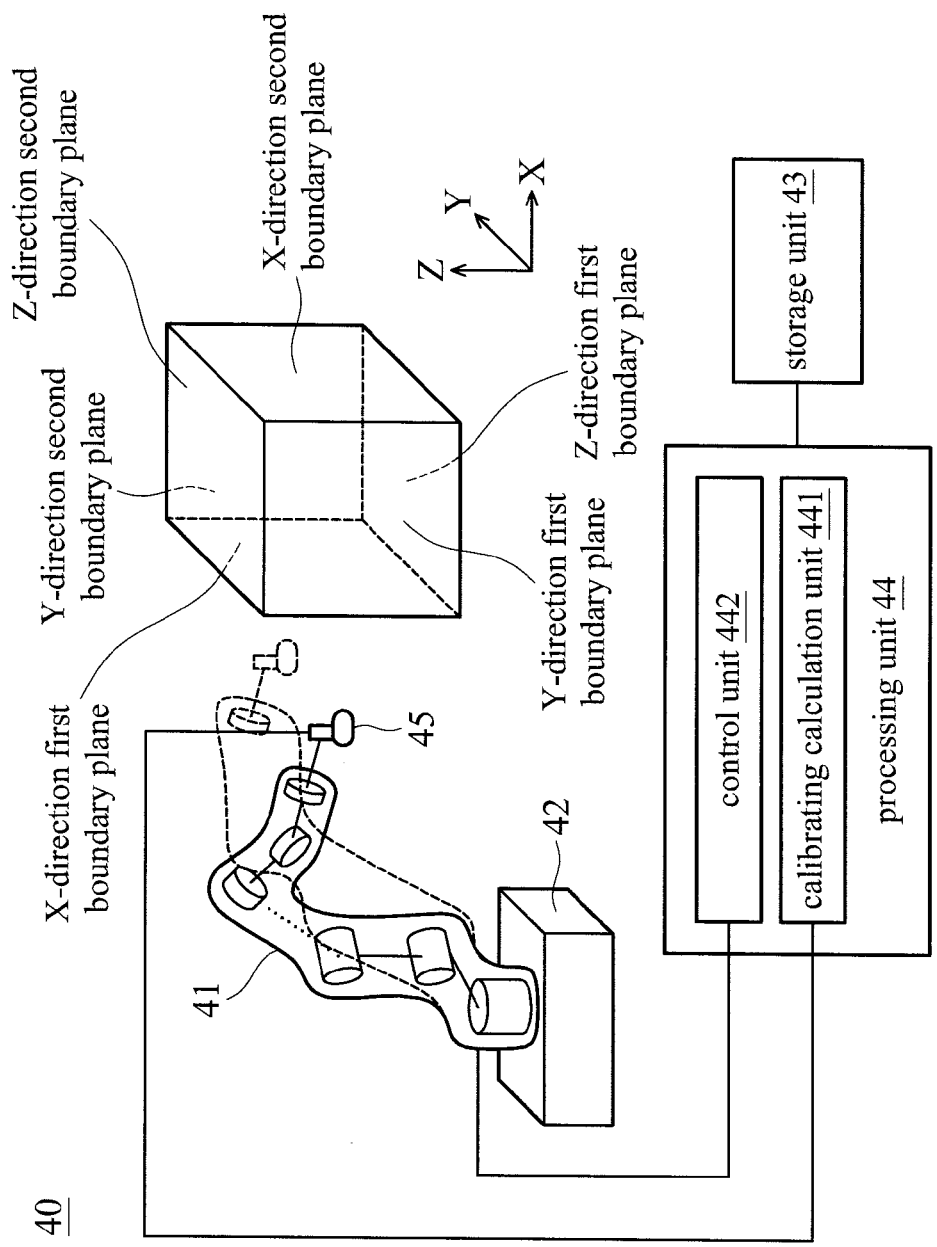
FIG. 4 is a system configuration diagram of a robotic arm system 40 according to an embodiment of the present disclosure.

FIG. 4 is a system configuration diagram of a robotic arm system 40 according to an embodiment of the present disclosure. In FIG. 4, the robotic arm system 40 comprises a robotic arm 41, a base 42, a storage unit 43, a processing unit 44 and a measuring instrument 45. The robotic arm 41 is disposed on the base 42 and electrically connected to the processing unit 44. The processing unit 44 is electrically connected to the storage unit 43 and the measuring instrument 45. The storage unit 43 is used to store nx mechanism parameter sets $xS_1 \sim xS_{nx}$ corresponding to the first-direction predictive positioning-points $xP_k$, k=1, ..., nx, ny mechanism parameter sets $yS_1 \sim yS_{ny}$ corresponding to the second-direction predictive positioning-points $yP_k$, k=1, ..., ny, and nz mechanism parameter sets $zS_1 \sim zS_{nz}$ corresponding to the third-direction predictive positioning-points $zP_k$, $k=1, \ldots, nz$ of the robotic arm 41. The processing unit 44 comprises a calibrating calculation unit 441 and a control unit 442.

In FIG. 4, the nx mechanism parameter sets $xS_1 \sim xS_{nx}$, the ny mechanism parameter sets $yS_1 \sim yS_{ny}$, and the nz mechanism parameter sets $zS_1 \sim zS_{nz}$ also comprise the size (arm length) of mechanical links, the connection orientations and angles between joint axes, the amount of joint variables, and other geometric variables.

In FIG. 4, the robotic arm system 40 obtains a set of mechanism parametric deviations $\Delta S$ through multiple calibration boundary planes. As shown in FIG. 4, the multiple calibration boundary planes comprise an X-direction first boundary plane, an X-direction second boundary plane, a Y-direction first boundary plane, a Y-direction second boundary plane, a Z-direction first boundary plane and a Z-direction second boundary plane.

In FIG. 4, the measuring instrument 45 is disposed on one end of the robotic arm 41, and the measuring instrument 45 can be a probe, a dial gauge, or a laser displacement meter which performs one-dimensional displacement measurement, or it can be a contact instrument or a non-contact instrument which performs displacement measurement. The present disclosure is not limited thereto. In another embodiment of the present disclosure, the measuring instrument 45 is not disposed on the end of the robotic arm 41, but is disposed in the configuration of the measuring instrument 25 shown in FIG. 2. At this moment, the measuring instrument 45 can be a coordinate-measuring machine or a laser tracker which performs spatial positioning measurement.

In FIG. 4, the measuring instrument 45 of the robotic arm system 40 utilizes the X-direction first boundary plane and the X-direction second boundary plane to measure first-direction measured relative-displacements $\Delta xMx_{i,j}$, $i=1, \ldots, nx-1$, $j=i+1, \ldots, nx$ corresponding to the first-direction predictive positioning-points $xP_k$, $k=1, \ldots, nx$. The processing unit 44 of the robotic arm system 40 calculates a three-dimensional predictive relative-displacement equation $G(xS_i, xS_j, \Delta S)$ corresponding to two first-direction predictive positioning-points $xP_i$ and $xP_j$. The three-dimensional predictive relative-displacement equation $G(xS_i, xS_j, \Delta S)$ is shown below:

$$\Delta xP_{i,j} \equiv G(xS_i, xS_j, \Delta S) = \begin{bmatrix} g_x(xS_i, xS_j, \Delta S) \\ g_y(xS_i, xS_j, \Delta S) \\ g_z(xS_i, xS_j, \Delta S) \end{bmatrix},$$

$$i = 1, \ldots, nx-1, j = i+1, \ldots, nx$$

Wherein $g_x(xS_i, xS_j, \Delta S)$, $g_y(xS_i, xS_j, \Delta S)$ and $g_z(xS_i, xS_j, \Delta S)$ are respectively a first-direction predictive relative-displacement equation, a second-direction predictive relative-displacement equation, and a third-direction predictive relative-displacement equation corresponding to the two first-direction predictive positioning-points $xP_i$ and $xP_j$.

In FIG. 4, the measuring instrument 45 of the robotic arm system 40 utilizes the Y-direction first boundary plane and the Y-direction second boundary plane to measure second-direction measured relative-displacements $\Delta yMy_{i,j}$, $i=1, \ldots, ny-1$, $j=i+1, \ldots, ny$ corresponding to the second-direction predictive positioning-points $xP_k$, $k=1, \ldots, ny$. The processing unit 44 of the robotic arm system 40 calculates a three-dimensional predictive relative-displacement equation $G(yS_i, yS_j, \Delta S)$ corresponding to two second-direction predictive positioning-points $yP_i$ and $yP_j$. The three-dimensional predictive relative-displacement equation $G(yS_i, yS_j, \Delta S)$ is shown below:

$$\Delta yP_{i,j} \equiv G(yS_i, yS_j, \Delta S) = \begin{bmatrix} g_x(yS_i, yS_j, \Delta S) \\ g_y(yS_i, yS_j, \Delta S) \\ g_z(yS_i, yS_j, \Delta S) \end{bmatrix},$$

$$i = 1, \ldots, ny-1, j = i+1, \ldots, ny$$

Wherein $g_x(yS_i, xS_j, \Delta S)$, $g_y(yS_i, yS_j, \Delta S)$ and $g_z(yS_i, yS_j, \Delta S)$ are respectively a first-direction predictive relative-displacement equation, a second-direction predictive relative-displacement equation, and a third-direction predictive relative-displacement equation corresponding to the two second-direction predictive positioning-points $yP_i$ and $yP_j$.

In FIG. 4, the measuring instrument 45 of the robotic arm system 40 utilizes the Z-direction first boundary plane and the Z-direction second boundary plane to measure third-direction measured relative-displacements $\Delta zMz_{i,j}$, $i=1, \ldots, ny-1$, $j=i+1, \ldots, nz$ corresponding to the third-direction predictive positioning-points $zP_k$, $k=1, \ldots, nz$. The processing unit 44 of the robotic arm system 40 calculates a three-dimensional predictive relative-displacement equation $G(zS_i, zS_j, \Delta S)$ corresponding to two third-direction predictive positioning-points $zP_i$ and $zP_j$. The three-dimensional predictive relative-displacement equation $G(zS_i, zS_j, \Delta S)$ is shown below:

$$\Delta zP_{i,j} \equiv G(zS_i, zS_j, \Delta S) = \begin{bmatrix} g_x(zS_i, zS_j, \Delta S) \\ g_y(zS_i, zS_j, \Delta S) \\ g_z(zS_i, zS_j, \Delta S) \end{bmatrix},$$

$$i = 1, \ldots, nz-1, j = i+1, \ldots, nz$$

Wherein $g_x(zS_i, zS_j, \Delta S)$, $g_y(zS_i, zS_j, \Delta S)$ and $g_z(zS_i, zS_j, \Delta S)$ are respectively a first-direction predictive relative-displacement equation, a second-direction predictive relative-displacement equation, and a third-direction predictive relative-displacement equation corresponding to the two third-direction predictive positioning-points $zP_i$ and $zP_j$.

In FIG. 4, the calibrating calculation unit 441 of the processing unit 44 calculates an optimization equation $\Phi$ of the robotic arm 41 according to the first-direction predictive relative-displacement equations $g_x(xS_i, xS_j, \Delta S)$ and the first-direction measured relative-displacements $\Delta xMx_{i,j}$ corresponding to the first-direction predictive positioning-points, the second-direction predictive relative-displacement equation $g_y(yS_i, yS_j, \Delta S)$ and the second-direction measured relative-displacements $\Delta yMy_{i,j}$ corresponding to the second-direction predictive positioning-points, and the third-direction predictive relative-displacement equation $g_z(zS_i, zS_j, \Delta S)$ and the third-direction measured relative-displacements $\Delta zMz_{i,j}$ corresponding to the third-direction predictive positioning-points. The optimization equation $\Phi$ is represented below:

$$\Phi = \min_{\Delta S} \left\{ \sum_{i=1}^{nx-1} \sum_{j=i+1}^{nx} (\Delta xMx_{i,j} - g_x(xS_i, xS_j, \Delta S))^2 + \right.$$

$$\sum_{i=1}^{ny-1} \sum_{j=i+1}^{ny} (\Delta yMy_{i,j} - g_y(yS_i, yS_j, \Delta S))^2 +$$

$$\sum_{i=1}^{nz-1} \sum_{j=i+1}^{nz} (\Delta zMz_{i,j} - g_z(zS_i, zS_j, \Delta S))^2 \Bigg\}$$

Then the processing unit 44 of the robotic arm system 40 utilizes an optimization algorithm and the optimization equation Φ to obtain a set of optimal mechanism parametric deviations ΔS. Finally, the processing unit 44 of the robotic arm system 40 uses the set of optimal mechanism parametric deviations ΔS to calibrate the mechanism parameter sets $xS_1$~$xS_{nx}$ corresponding to the first-direction predictive positioning-points $xP_1$~$xP_{nx}$, the mechanism parameter sets $yS_1$~$yS_{ny}$ corresponding to the second-direction predictive positioning-points $yP_1$~$yP_{ny}$ and the mechanism parameter sets $zS_1$~$zS_{nz}$, corresponding to the third-direction predictive positioning-points $zP_1$~$zP_{nz}$ of the robotic arm 41.

In another embodiment of the present disclosure, the robotic arm system 40 performs only one-dimensional measurement and calculation and obtains a corresponding optimization equation Φ. The one dimension comprises the X-direction, Y-direction or Z-direction. E.g. the robotic arm system 40 only performs X-direction measurement and calculation. In this case, the calibrating calculation unit 441 of the processing unit 44 calculates the optimization equation Φ of the robotic arm 41 according to the first-direction predictive relative-displacement equations $g_x(xS_i, xS_j, \Delta S)$ and the first-direction measured relative-displacements $\Delta xMx_{i,j}$ corresponding to the first-direction predictive positioning-points. The optimization equation Φ is represented below:

$$\Phi = \min_{\Delta S} \Bigg\{ \sum_{i=1}^{nx-1} \sum_{j=i+1}^{nx} (\Delta xMx_{i,j} - g_x(xS_i, xS_j, \Delta S))^2 \Bigg\}$$

In this case, the processing unit 44 of the robotic arm system 40 also utilizes an optimization algorithm and the optimization equation Φ of X-direction to obtain a set of optimal mechanism parametric deviations ΔS. Finally, the processing unit 44 of the robotic arm system 40 uses the set of optimal mechanism parametric deviations ΔS to calibrate the mechanism parameter sets $xS_1$~$xS_{nx}$ corresponding to the first-direction predictive positioning-points $xP_1$~$xP_{nx}$ of the robotic arm 41.

In another embodiment of the present disclosure, the robotic arm system 40 performs measurement and calculation in only two dimensions and obtains a corresponding optimization equation Φ. The two dimensions may comprise the X-direction and Y-direction, the Y-direction and Z-direction, or the X-direction and Z-direction. E.g. the robotic arm system 40 performs measurement and calculation in only first and second directions (the X-direction and Y-direction). In this case, the calibrating calculation unit 441 of the processing unit 44 calculates an optimization equation Φ of the robotic arm 41 according to the first-direction predictive relative-displacement equations $g_x(xS_i, xS_j, \Delta S)$ and the first-direction measured relative-displacements $\Delta xMx_{i,j}$ corresponding to the first-direction predictive positioning-points and the second-direction predictive relative-displacement equation $g_y(yS_i, yS_j, \Delta S)$ and the second-direction measured relative-displacements $\Delta yMy_{i,j}$ corresponding to the second-direction predictive positioning-points. The optimization equation Φ is represented below:

$$\Phi = \min_{\Delta S} \Bigg\{ \sum_{i=1}^{nx-1} \sum_{j=i+1}^{nx} (\Delta xMx_{i,j} - g_x(xS_i, xS_j, \Delta S))^2 + \sum_{i=1}^{ny-1} \sum_{j=i+1}^{ny} (\Delta yMy_{i,j} - g_x(yS_i, yS_j, \Delta S))^2 \Bigg\}$$

In this case, the processing unit 44 of the robotic arm system 40 also utilizes an optimization algorithm and the optimization equation Φ of X-direction and Y-direction to obtain a set of optimal mechanism parametric deviations ΔS. Finally, the processing unit 44 of the robotic arm system 40 uses the set of optimal mechanism parametric deviations ΔS to calibrate the mechanism parameter sets $xS_1$~$xS_{nx}$ corresponding to the first-direction predictive positioning-points $xP_1$~$xP_{nx}$ and the mechanism parameter sets $yS_1$~$yS_{ny}$ corresponding to the second-direction predictive positioning-points $yP_1$~$yP_{ny}$ of the robotic arm 41.

It should be noted that, in the choices of the optimization algorithm of the robotic arm system 40, the processing unit 44 adopts the optimization algorithm with a non-linear equation. Because the first-direction predictive relative-displacement equations $g_x(xS_i, xS_j, \Delta S)$, the second-direction predictive relative-displacement equation $g_y(yS_i, yS_j, \Delta S)$ and the third-direction predictive relative-displacement equation $g_z(zS_i, zS_j, \Delta S)$ used for calculating the robotic arm 41 are almost equivalent to the robot non-linear mathematical model, approximation errors of $g_x(xS_i, xS_j, \Delta S)$, $g_y(yS_i, yS_j, \Delta S)$ and $g_z(zS_i, zS_j, \Delta S)$ are extremely small. Accordingly, the optimization convergence effect of the set of mechanism parametric deviations ΔS obtained by the optimization equation Φ of the robotic arm system 40 is greater than the optimization convergence effect of the set of mechanism parametric deviations ΔS obtained by the optimization equation Φ of the robotic arm system 10.

Finally, it should be noted that the optimization algorithm utilized in the robotic arm system 20 and the robotic arm system 40 comprises the Least-Squares method, Gradient-Descent method, Gauss-Newton method or Levenberg-Marquardt method, but the present disclosure is not limited thereto.

Figure 5:
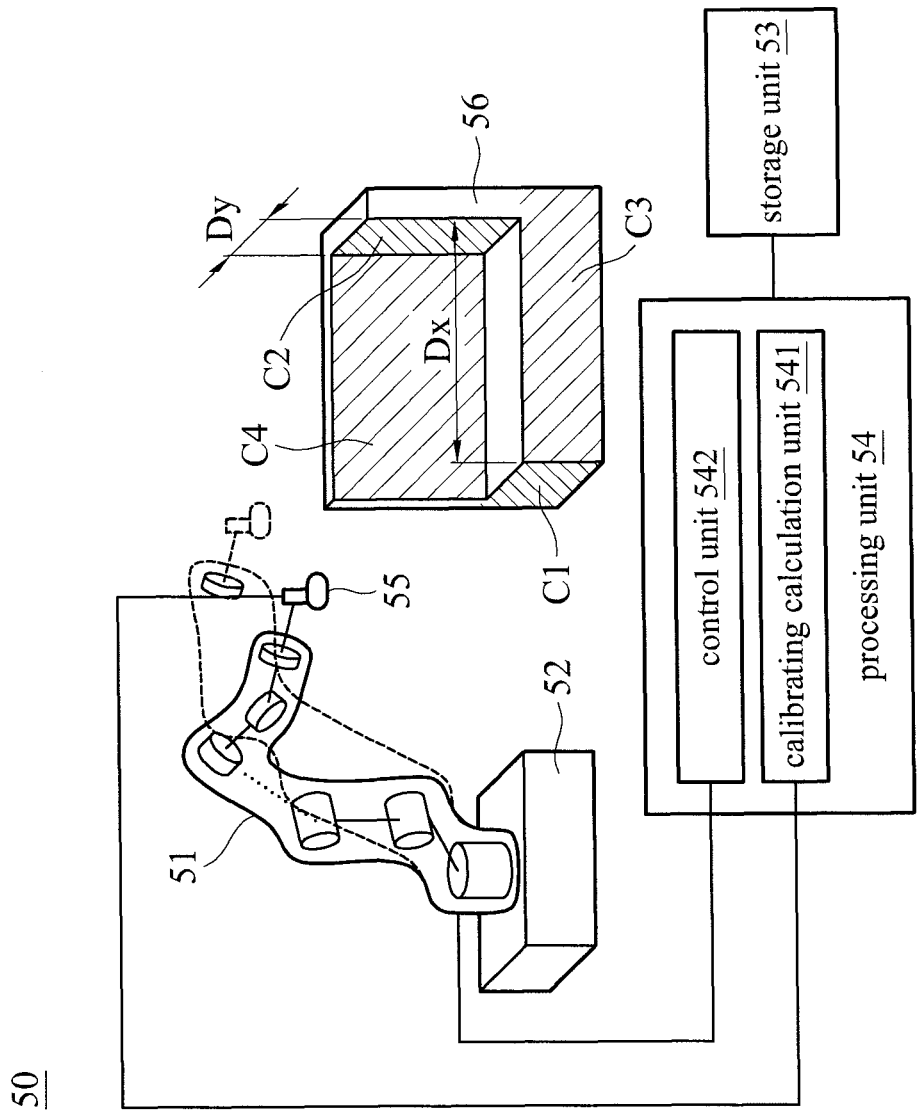
FIG. 5 illustrates that how a robotic arm system 50 measures first-direction measured relative-displacements $\Delta x M x_{i,j}$, i=1, ..., nx−1, j=i+1, ..., nx corresponding to the first-direction predictive positioning-points, second-direction measured relative-displacements $\Delta y M y_{i,j}$, i=1, ..., ny−1, j=i+1, ..., ny corresponding to the second-direction predictive positioning-points, and third-direction measured relative-displacements $\Delta z M z_{i,j}$, i=1, ..., ny−1, j=i+1, ..., nz corresponding to the third-direction predictive positioning-points according to an embodiment of the present disclosure.

FIG. 5 illustrates that how a robotic arm system 50 measures first-direction measured relative-displacements $\Delta xMx_{i,j}$, i=1, . . . , nx−1, j=i+1, . . . , nx corresponding to the first-direction predictive positioning-points, second-direction measured relative-displacements $\Delta yMy_{i,j}$, i=1, . . . , ny−1, j=i+1, . . . , ny corresponding to the second-direction predictive positioning-points, and third-direction measured relative-displacements $\Delta zMz_{i,j}$, i=1, . . . , nz−1, j=i+1, . . . , nz corresponding to the third-direction predictive positioning-points according to an embodiment of the present disclosure. Similar to the robotic arm system 40 shown in FIG. 4, the robotic arm system 50 shown in FIG. 5 comprises a robotic arm 51, a base 52, a storage unit 53, a processing unit 54, a measuring instrument 55 and a calibration (fixture) block 56. The robotic arm 51 is disposed on the base 52 and is electrically connected to the processing unit 54. The processing unit 54 is electrically connected to the storage unit 53 and the measuring instrument 55. The storage unit 53 is used to store the mechanism parameter sets $xS_1$~$xS_{nx}$ corresponding to the first-direction predictive positioning-points $xP_1$~$xP_{nx}$ the mechanism parameter sets $yS_1$~$yS_{ny}$ corresponding to the second-direction predictive positioning-points $yP_1$~$yP_{ny}$ and the mechanism parameter sets $zS_1$~$zS_{nz}$ corresponding to the third-direction predictive positioning-points $zP_1 \sim zP_{nz}$ of the robotic arm 51. The processing unit 54 comprises a calibrating calculation unit 541 and a control unit 542. The calibration block 56 comprises a first precision plane C1, a second precision plane C2, a third precision plane C3, a fourth precision plane C4, a fifth precision plane C5 (not shown) and a sixth precision plane C6 (not shown).

In FIG. 5, when the robotic arm system 50 proceeds with the measurement, the X-direction first boundary plane and the X-direction second boundary plane are implemented by the first precision plane C1 and the second precision plane C2 respectively, the Y-direction first boundary plane and the Y-direction second boundary plane are implemented by the third precision plane C3 and the fourth precision plane C4 respectively, and the Z-direction first boundary plane and the Z-direction second boundary plane are implemented by the fifth precision plane C5 and the sixth precision plane C6 respectively. The first precision plane C1 and the second precision plane C2 are the first-direction displacement parameter Dx apart, and the first precision plane C1 and the second precision plane C2 are both perpendicular to the first direction. The third precision plane C3 and the fourth precision plane C4 are the second-direction displacement parameter Dy apart, and the third precision plane C3 and the fourth precision plane C4 are both perpendicular to the second direction. The fifth precision plane C5 and the sixth precision plane C6 are the third-direction displacement parameter Dz apart, and the fifth precision plane C5 and the sixth precision plane C6 are both perpendicular to the third direction. The present disclosure is not limited thereto. E.g. the robotic arm system 50 can directly move the calibration block 56 in the first direction so that the first precision plane C1 is equivalent to the second precision plane C2. In FIG. 5, the calibration block 56 can be a straight edge, a processing machinery fixture block or other hardware structures which have at least one high precision plane for measured displacement.

In FIG. 5, the first-direction predictive positioning-points $xP_k$, $k=1, \ldots, nx$ are described as a set of functions $F(xS_k + \Delta S)$, $k=1, \ldots, nx$ corresponding to the mechanism parameter sets $xS_k$, $k=1, \ldots, nx$. The calibration calculation unit 541 of the processing unit 54 determines a first-direction predictive relative-displacement $\Delta xP_{i,j} = xP_j - xP_i$, between each two of the first-direction predictive positioning-points $xP_1 \sim xP_{nx}$. The three-dimensional predictive relative-displacement equation $G(xS_i, xS_j, \Delta S)$ between two of the first-direction predictive positioning-points $xP_i$ and $xP_j$ is represented below:

$$\Delta xP_{i,j} = xP_j - xP_i$$
$$\equiv F(xS_j + \Delta S) - F(xS_i + \Delta S)$$
$$\equiv G(xS_i, xS_j, \Delta S)$$
$$= \begin{bmatrix} g_x(xS_i, xS_j, \Delta S) \\ g_y(xS_i, xS_j, \Delta S) \\ g_z(xS_i, xS_j, \Delta S) \end{bmatrix},$$
$$i = 1, \ldots, nx-1, j = i+1, \ldots, nx$$

Accordingly, the calibration calculation unit 541 of the processing unit 54 calculates the first-direction predictive relative-displacement equations $g_x(xS_i, xS_j, \Delta S)$ corresponding to the first-direction predictive positioning-points.

In FIG. 5, the measuring instrument 55 measures a first-direction measured displacement $xMx_k$ between the end of the robotic arm 51 and the first precision plane C1 while performing each of the actions.

The calibration calculation unit 541 determines, according to the first-direction measured displacements $xMx_k$, a first-direction measured relative-displacement $\Delta xMx_{i,j}$, $i=1, \ldots, nx-1, j=i+1, \ldots, nx$ moved by the end of the robotic arm 51 while performing each two of the actions.

In FIG. 5, the processing unit 54 controls the posture of the robotic arm 51 so that the measuring direction of the measuring instrument 55 is forward, toward the first precision plane C1 of the calibration block 56. Then the processing unit 54 controls the robotic arm 51 so that the end of the robotic arm 51 moves toward the first-direction predictive positioning-points $xP_1 \sim xP_{nx}$ which are located within sensing range of the measuring instrument 55. At this moment, the measuring instrument 55 measures the first-direction measured displacement $\Delta xMx_k$, $k=1, \ldots, nx$ ($xMx_1 \sim xMx_{nx}$) between the end of the robotic arm 51 and the first precision plane C1. The processing unit 54 determines the first-direction measured relative-displacement $\Delta xMx_{i,j}$, $i=1, \ldots, nx-1, j=i+1, \ldots, nx$ corresponding to the first-direction predictive relative-displacement $\Delta xP_{i,j}$ according to the first-direction measured displacements $xMx_1 \sim xMx_{nx}$. The first-direction measured relative-displacement $\Delta xMx_{i,j}$ is a relative displacement measured by one-dimensional measurement by the measuring instrument 55.

In FIG. 5, the first-direction measured relative-displacement $\Delta xMx_{i,j}$ corresponding to the first-direction predictive positioning-points $xP_i$ and $xP_j$ is represented below:

$$\Delta xMx_{i,j} = xMx_j - xMx_i + Dx, \quad i=1, \ldots, nx-1, \\ j=i+1, \ldots, nx$$

Wherein if the first-direction measured displacements $xMx_i$ and $xMx_j$ are measured by the same precision plane (e.g. both measured by the first precision plane C1), then the value of Dx is 0. If the first-direction measured displacements $xMx_i$ and $xMx_j$ are measured by two parallel precision planes (e.g. measured by the first precision plane C1 and the second precision plane C2), then Dx is a first-direction relative displacement between the two parallel precision planes.

In FIG. 5, the distance between the measuring instrument 55 and the first precision plane C1 is required to be smaller than the sensing range of the measuring instrument 55. Because the first-direction predictive positioning-points $xP_1 \sim xP_{nx}$ are not all located within sensing range of the measuring instrument 55, it is required to increase the sensing displacement measured by the measuring instrument 55. Accordingly, the robotic arm system 50 uses the second precision plane C2 which is the first-direction displacement Dx away from the first precision plane C1 to solve the inadequate sensing range of the measuring instrument 55. In addition, if the first-direction predictive positioning-points $xP_1 \sim xP_{nx}$ are all located within sensing range of the measuring instrument 55, the robotic arm system 50 only requires the first precision C1 to measure the first-direction measured relative-displacement $\Delta xMx_{i,j}$.

When a first-direction pitch between an out-of-range first-direction predictive positioning-point $xP_k$ and the first precision plane C1 exceeds the maximum sensing range of the measuring instrument 55 in the first direction, the processing unit 54 controls the robotic arm 51 so that the end of the robotic arm 51 moves toward the out-of-range first-direction predictive positioning-point $xP_k$ which is in front of the second precision plane C2 of the calibration block 56 to sense the first-direction measured displacement $\Delta xMx_{i,j}$ between the end of the robotic arm 51 and the first precision plane C1. Through the method of adding a boundary plane, the first-direction measured relative-displacement $\Delta xMx_{i,j}$ corresponding to the first-direction predictive positioning-points $xP_i$ and $xP_j$ is not limited to the sensing range of the measuring instrument 55.

Figure 1:
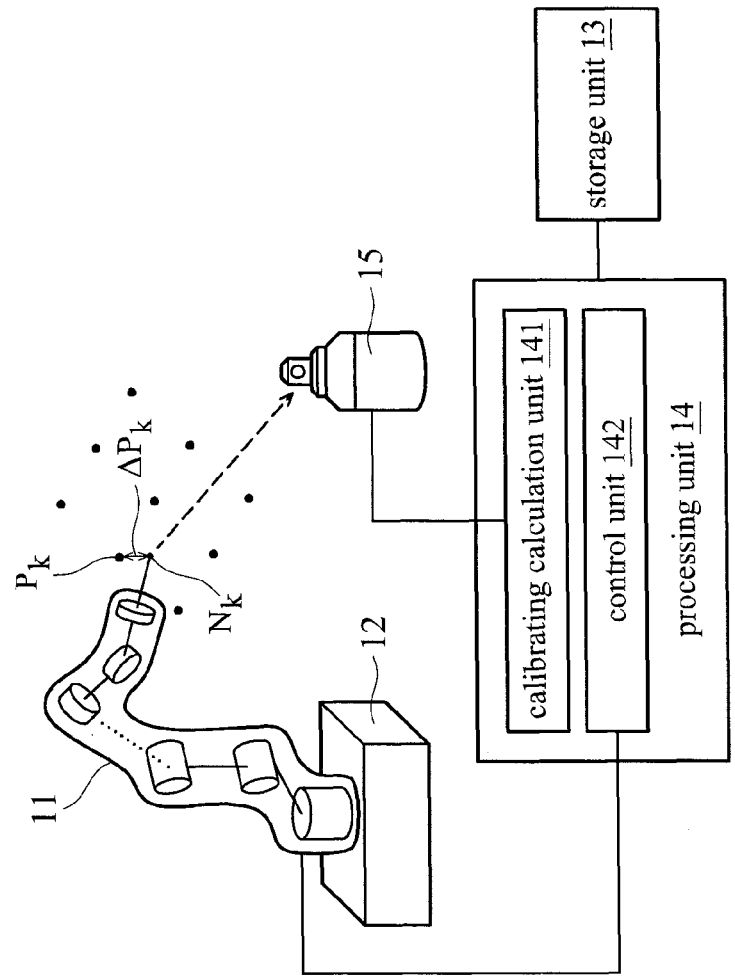
FIG. 1 is a schematic diagram of the robotic arm system 10.

Unlike the measuring instrument 25 illustrated in FIG. 2, the measuring instrument 55 of the robotic arm system 50 in FIG. 5 is disposed on the end of the robotic arm 51. Therefore the measuring instrument 55 can be a probe, a dial gauge, or a laser displacement meter, which performs one-dimensional displacement measurement, or it can be a contact instrument or a non-contact instrument which performs displacement measurement. The displacement meter adopted by the measuring instrument 55 costs less and can be used to obtain practical measurements more easily than either the measuring instrument 25 illustrated in FIG. 2 or the measuring instrument 15 in FIG. 1.

In the same manner, the measuring instrument 55 of the robotic arm system 50 measures, through the third precision plane C3 and the fourth precision plane C4, the second-direction predictive positioning-points $yP_k$, k=1, . . . , ny ($yP_1$~$yP_{ny}$) to obtain the second-direction measured relative-displacements $\Delta yMy_{i,j}$, i=1, . . . , ny−1, j=i+1, . . . , ny corresponding to the second-direction predictive positioning-points $yP_i$ and $yP_j$. The processing unit 54 obtains the second-direction predictive relative-displacement equation $g_y(yS_i, yS_j, \Delta S)$ according to the mechanism parameter sets $yS_1$~$yS_{ny}$.

Similarly, the processing unit 54 obtains the third-direction predictive relative-displacement equation $g_z(zS_i, zS_j, \Delta S)$ according to the mechanism parameter sets $zS_1$~$zS_{nz}$. The measuring instrument 55 also measures, through the fifth precision plane C5 and the sixth precision plane C6, the third-direction predictive positioning-points $zP_k$, k=1, . . . , nz ($zP_1$~$zP_{nz}$) to obtain the third-direction measured relative-displacements $\Delta zMz_{i,j}$, i=1, . . . , nz−1, j=i+1, . . . , nz corresponding to the third-direction predictive positioning-points $zP_i$ and $zP_j$.

Then the calibration calculation unit 541 of the processing unit 54 calculates an optimization equation $\Phi$ according to $g_x(xS_i, xS_j, \Delta S)$, $\Delta xMx_{i,j}$, $g_y(yS_i, yS_j, \Delta S)$, $A\Delta yMy_{i,j}$, $g_z(zS_i, zS_j, \Delta S)$ and $\Delta zMz_{i,j}$.

Then the processing unit 54 of the robotic arm system 50 also utilizes an optimization algorithm and the optimization equation $\Phi$ to obtain a set of optimal mechanism parametric deviations $\Delta S$. Finally, the processing unit 54 of the robotic arm system 50 uses the set of optimal mechanism parametric deviations $\Delta S$ to calibrate the mechanism parameter sets $xS_1$~$xS_{nx}$ corresponding to the first-direction predictive positioning-points $xP_1$~$xP_{nx}$, the mechanism parameter sets $yS_1$~$yS_{ny}$ corresponding to the second-direction predictive positioning-points $yP_1$~$yP_{ny}$ and the mechanism parameter sets $zS_1$~$zS_{nz}$ corresponding to the third-direction predictive positioning-points $zP_1$~$zP_{nz}$ of the robotic arm 51.

Figure 6:
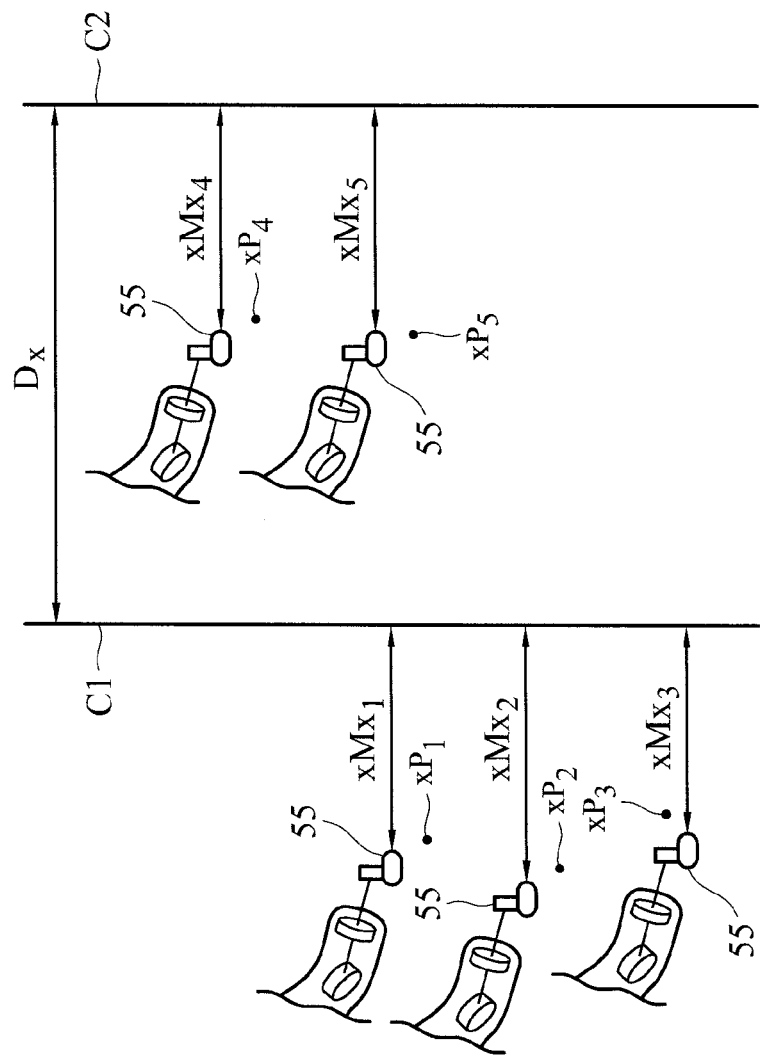
FIG. 6 illustrates how the robotic system 50 measures the first-direction measured relative-displacements $\Delta x M x_{i,j}$, i=1, ..., 4, j=i+1, ..., 5 corresponding to the first-direction predictive positioning-points $xP_1 \sim xP_5$ according to an embodiment of the present disclosure.

FIG. 6 illustrates how the robotic system 50 measures the first-direction measured relative-displacement $\Delta xMx_{i,j}$, i=1, . . . , 4, j=i+1, . . . , 5 corresponding to the first-direction predictive positioning-points $xP_1$~$xP_5$ according to an embodiment of the present disclosure. In FIG. 6, the processing unit 54 of the robotic system 50 controls, according to a plurality of mechanism parameter sets $xS_1$~$xS_5$, the robotic arm 51 to perform a plurality of actions so that the end of the robotic arm 51 moves toward the corresponding plurality of first-direction predictive positioning-points $xP_1$~$xP_5$.

In FIG. 6, the processing unit 54 of the robotic system 50 controls the posture of the robotic arm 51 so that the measuring direction of the measuring instrument 55 towards the first precision plane C1 of the calibration block 56. Then the processing unit 54 controls, according to a plurality of mechanism parameter sets $xS_1$~$xS_3$, the robotic arm 51 so that the end of the robotic arm 51 moves toward the first-direction predictive positioning-points $xP_1$~$xP_3$ which are located within sensing range of the measuring instrument 55. At this moment, the measuring instrument 55 measures the first-direction measured displacements $xMx_1$, $xMx_2$, $xMx_3$ between the end of the robotic arm 51 and the first precision plane C1. The processing unit 54 respectively determines the first-direction measured relative-displacements $\Delta xMx_{1,2}$, (i.e. $xMx_2-xMx_1$), $\Delta xMx_{1,3}$ (i.e. $xMx_3-xMx_1$), $\Delta xMx_{2,3}$ (i.e. $xMx_3-xMx_{21}$) corresponding to the first-direction predictive relative-displacement $\Delta xP_{1,2}$, $\Delta xP_{1,3}$, $\Delta xP_{2,3}$ according to the first-direction measured displacements $xMx_1$~$xMx_3$.

Because the first-direction predictive positioning-points $xP_4$ and $xP_5$ with respect to the first precision plane C1 are located out of sensing range of the measuring instrument 55, the measuring instrument 55 measures the first-direction measured displacements $xMx_4$, $xMx_5$ between the end of the robotic arm 51 and the second precision plane C2. The processing unit 54 respectively determines the first-direction measured relative-displacement $\Delta xMx_{5,4}$ (i.e. $xMx_5-xMx_{41}$) corresponding to the first-direction predictive relative-displacement $\Delta xP_{4,5}$ according to the first-direction measured displacements $xMx_4$ and $xMx_5$.

In FIG. 6, when the processing unit 54 of the robotic system 50 calculates the first-direction measured relative-displacement $\Delta xMx_{i,j}$ (e.g. $\Delta xMx_{1,4}$) measured from two different sensing ranges, the first-direction relative displacement Dx between the two parallel precision planes is taken into consideration. Therefore the first-direction measured relative-displacements $\Delta xMx_{i,j}$ are represented below:

$$\Delta xMx_{i,j}=xMx_j-xMx_i+Dx,\ i=1,2,3,\ j=4,5$$

Figure 7:
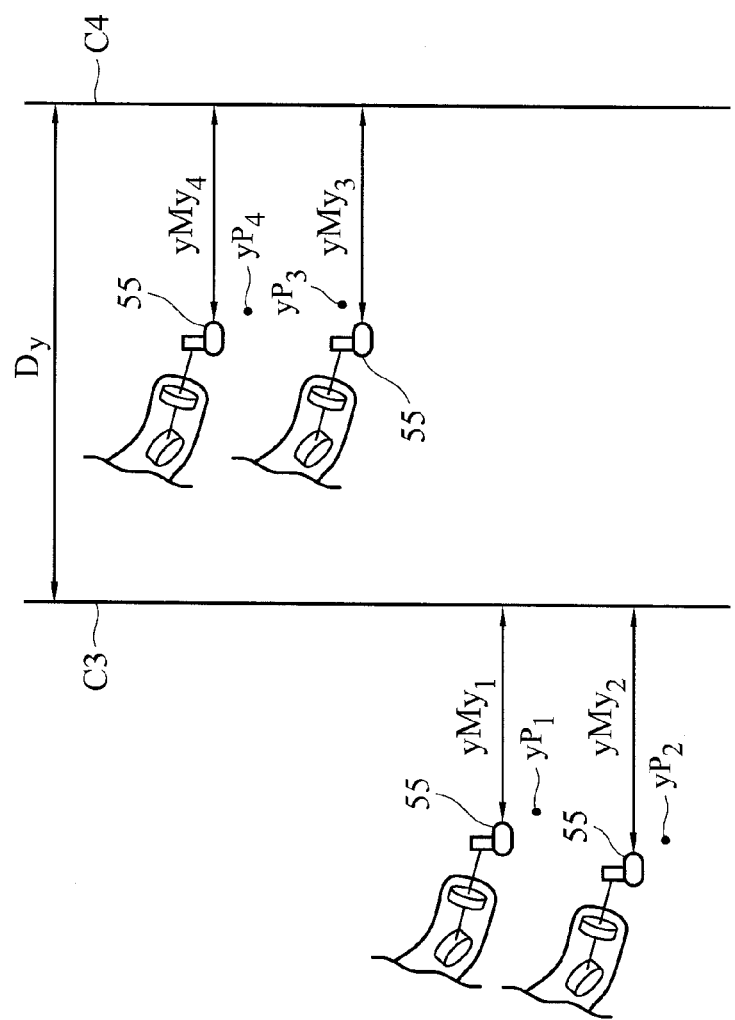
FIG. 7 illustrates how the robotic system 50 measures the second-direction measured relative-displacements $\Delta y M y_{i,j}$, i=, ..., 3, j=i+1, ..., 4 corresponding to the second-direction predictive positioning-points $yP_1 \sim yP_4$ according to an embodiment of the present disclosure.
Figure 8A:
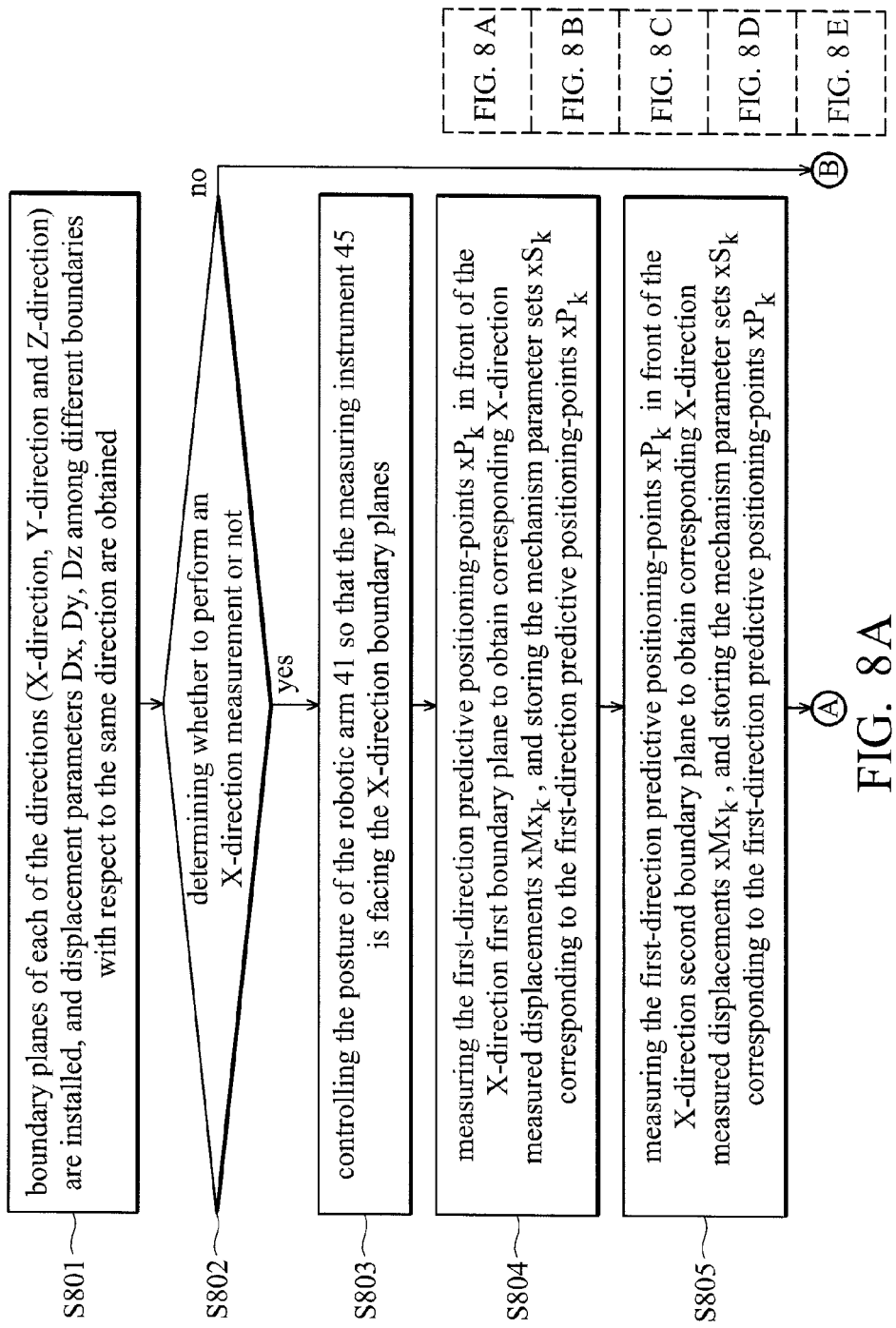
FIGS. 8A-8E show a flow diagram illustrating a mechanism-parametric-calibration method for the robotic arm system 40.
Figure 8B:
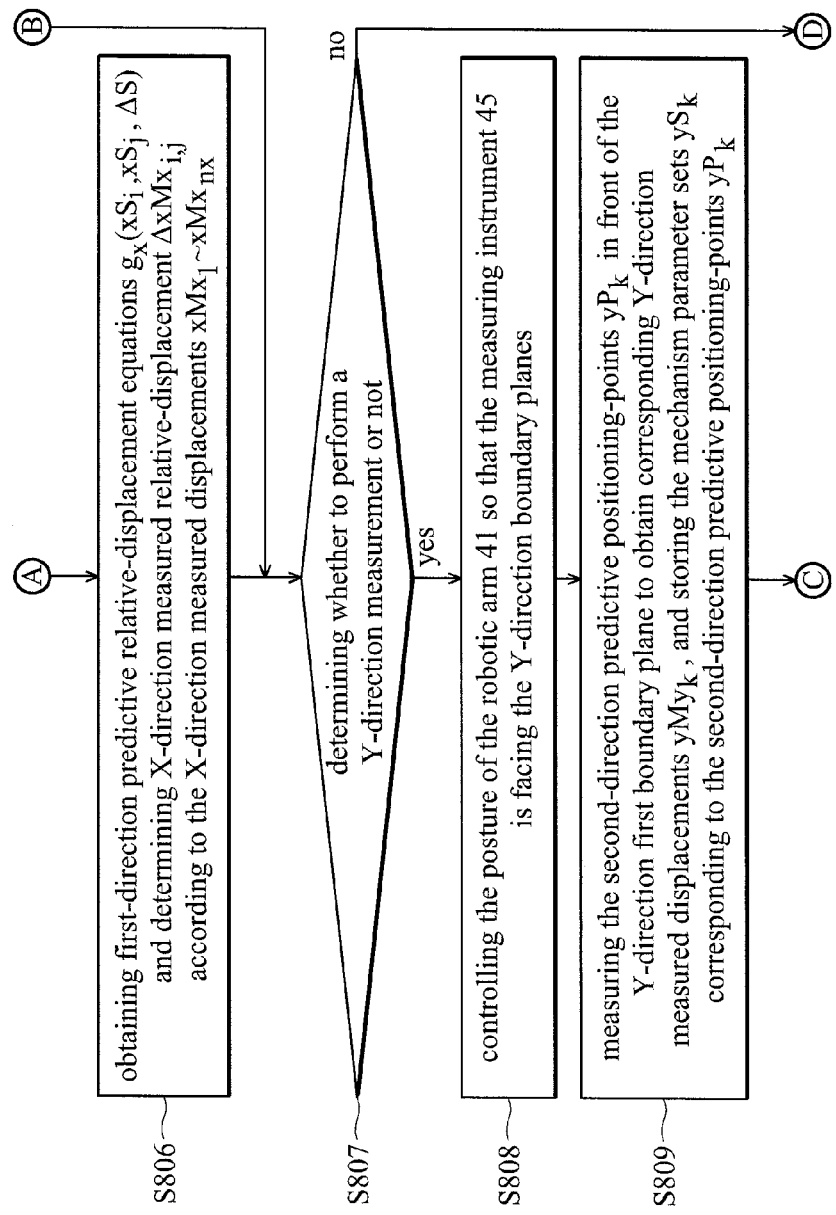
Figure 8C:
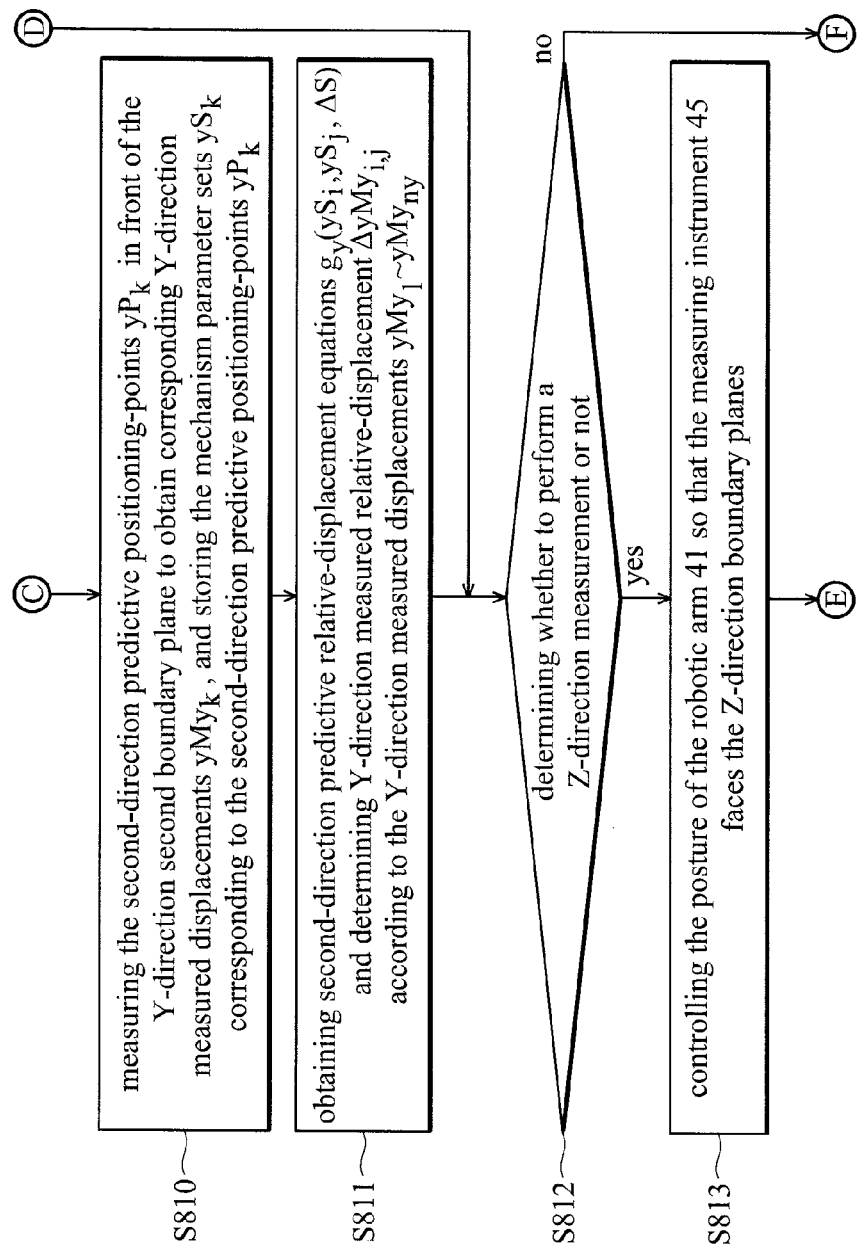
Figure 8D:
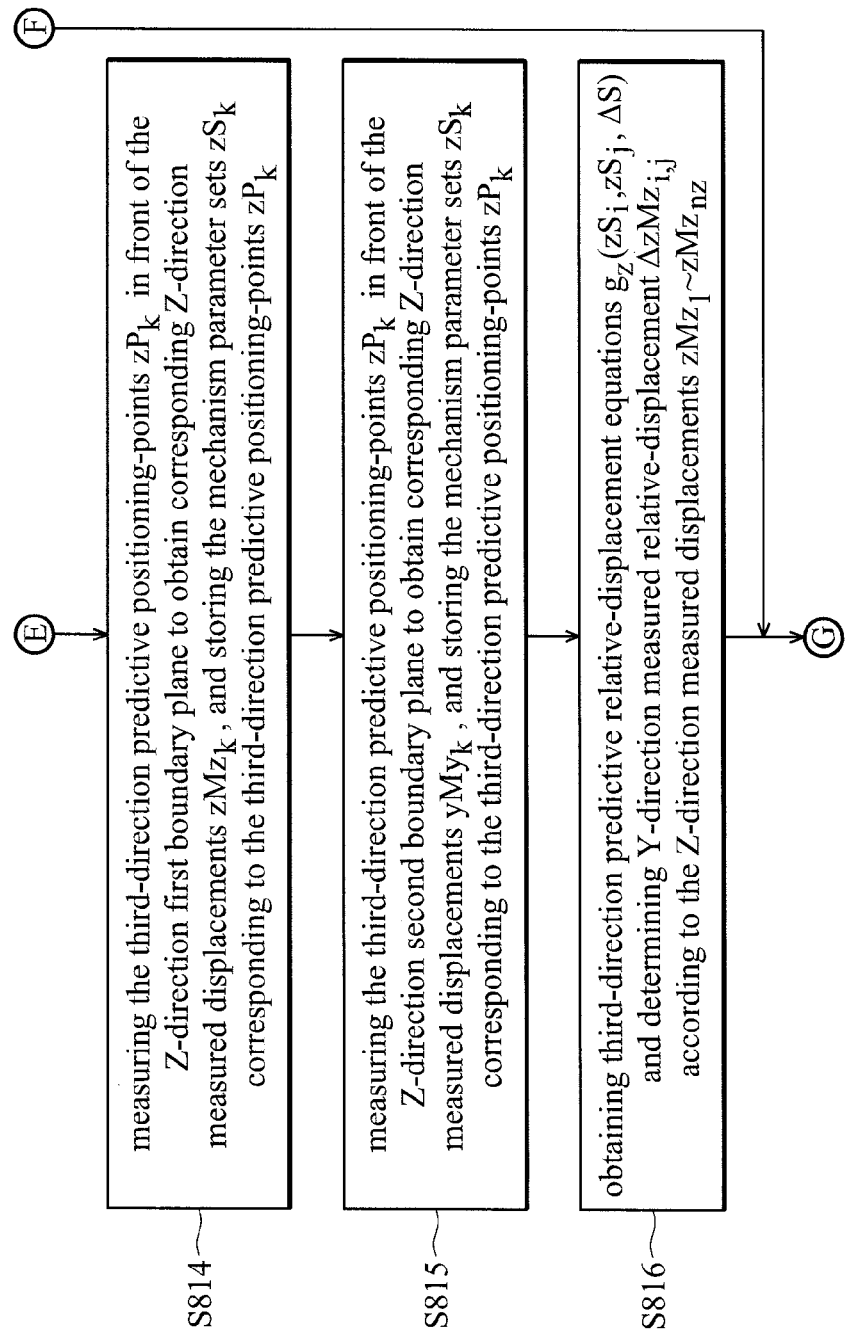
Figure 8E:
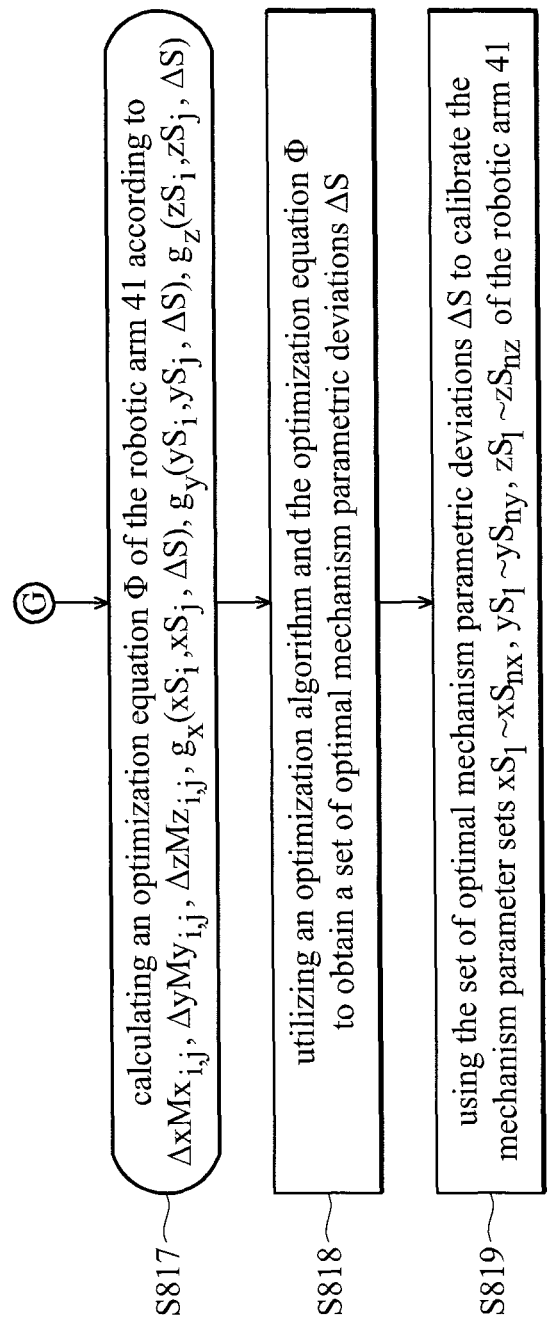

FIG. 7 illustrates how the robotic system 50 measures the second-direction measured relative-displacement $\Delta yMy_{i,j}$, i=1, . . . , 3, j=i+1, . . . , 4 corresponding to the second-direction predictive positioning-points $yP_1$~$yP_4$ according to an embodiment of the present disclosure. In FIG. 7, the processing unit 54 of the robotic system 50 controls, according to a plurality of mechanism parameter sets $yS_1$~$yS_4$, the robotic arm 51 to perform a plurality of actions so that the end of the robotic arm 51 moves toward the corresponding plurality of second-direction predictive positioning-points $yP_1$~$yP_4$.

In FIG. 7, the second-direction predictive positioning-points $yP_1$~$yP_2$ are located within sensing range of the measuring instrument 55 with respect to the third precision plane C3, and the second-direction predictive positioning-points $yP_3$~$yP_4$ are located within sensing range of the measuring instrument 55 with respect to the fourth precision plane C4. The measuring instrument 55 measures the second-direction measured displacements $yMy_1$ and $yMy_2$ between the end of the robotic arm 51 and the third precision plane C3. Then the measuring instrument 55 measures the second-direction measured displacements $yMy_3$ and $yMy_4$ between the end of the robotic arm 51 and the fourth precision plane C4. The processing unit 54 respectively determines the second-direction measured relative-displacements $\Delta yMy_{1,2}$ (i.e. $yMy_2-yMy_1$) and $\Delta yMy_{3,4}$ (i.e. $yMy_4-yMy_3$) corresponding to the second-direction predictive relative-displacements $\Delta yP_{1,2}$ and $\Delta yP_{3,4}$. Similarly, in consideration of a second-direction relative displacement Dy between the third precision plane C3 and the fourth precision plane C4, the processing unit 54 obtains second-direction measured relative-displacements $\Delta yMy_{i,j} = yMy_g - yMy_t + Dy$, i=1, 2, j=3, 4.

Similarly, using the same measuring method used in FIG. 6 and FIG. 7, the robotic system 50 may also obtain third-direction measured relative-displacements $\Delta zMz_{i,j}$, i=1, . . . , nz–1, j=i+1, . . . , nz corresponding to the third-direction predictive positioning-points according to the mechanism parameter sets $zS_1 \sim zS_{nz}$.

FIGS. 8A-8E show a flow diagram illustrating a mechanism-parametric-calibration method for the robotic arm system 40. In step S801, boundary planes of each of the directions (X-direction, Y-direction and Z-direction) are installed, and displacements parameters Dx, Dy, Dz among different boundaries with respect to the same direction are obtained. In step S802, the robotic arm system 40 or a manipulator of the robotic arm system 40 determines whether to perform an X-direction measurement or not. If yes, the method proceeds to step S803. Otherwise, the method proceeds to step S807. In step S803, the processing unit 44 of the robotic system 40 controls the posture of the robotic arm 41 so that the measuring instrument 45 is facing the X-direction boundary planes.

In step S804, the processing unit 44 of the robotic arm system 40 controls the robotic arm 41 so that the robotic arm 41 moves toward random distinct first-direction predictive positioning-points $xP_k$ in front of the X-direction first boundary plane. At this moment, the measuring instrument 45 measures the first-direction predictive positioning-points $xP_k$ in front of the X-direction first boundary plane to obtain corresponding X-direction measured displacements $xMx_k$, and the mechanism parameter sets $xS_k$ corresponding to the first-direction predictive positioning-points $xP_k$ are stored.

In step S805, the processing unit 44 of the robotic arm system 40 controls the robotic arm 41 so that the robotic arm 41 moves toward random distinct first-direction predictive positioning-points $xP_k$ in front of the X-direction second boundary plane. At this moment, the measuring instrument 45 measures the first-direction predictive positioning-points $xP_k$ in front of the X-direction second boundary plane to obtain corresponding X-direction measured displacements $xMx_k$, and the mechanism parameter sets $xS_k$ corresponding to the first-direction predictive positioning-points $xP_k$ are stored. In step S806, the processing unit 44 of the robotic arm system 40 obtains first-direction predictive relative-displacement equations $g_x(xS_i, xS_j, \Delta S)$ corresponding to the first-direction predictive positioning-points and determines X-direction measured relative-displacement $\Delta xMx_{i,j}$ according to the X-direction measured displacements $xMx_1 \sim xMx_{nx}$. Then the method proceeds to step S807.

In step S807, the robotic arm system 40 or the manipulator of the robotic arm system 40 determines whether to perform a Y-direction measurement or not. If yes, the method proceeds to step S808. Otherwise, the method proceeds to step S8012. In step S808, the processing unit 44 of the robotic system 40 controls the posture of the robotic arm 41 so that the measuring instrument 45 is facing the Y-direction boundary planes.

In step S809, the processing unit 44 of the robotic arm system 40 controls the robotic arm 41 so that the robotic arm 41 moves toward random distinct second-direction predictive positioning-points $yP_k$ in front of the Y-direction first boundary plane. At this moment, the measuring instrument 45 measures the second-direction predictive positioning-points $yP_k$ in front of the Y-direction first boundary plane to obtain corresponding Y-direction measured displacements $yMy_k$, and the mechanism parameter sets $yS_k$ corresponding to the second-direction predictive positioning-points $yP_k$ are stored.

In step S810, the processing unit 44 of the robotic arm system 40 controls the robotic arm 41 so that the robotic arm 41 moves toward random distinct second-direction predictive positioning-points $yP_k$ in front of the Y-direction second boundary plane. At this moment, the measuring instrument 45 measures the second-direction predictive positioning-points $yP_k$ in front of the Y-direction second boundary plane to obtain corresponding Y-direction measured displacements $yMy_k$, and the mechanism parameter sets $yS_k$ corresponding to the second-direction predictive positioning-points $yP_k$ are stored. In step S811, the processing unit 44 of the robotic arm system 40 obtains second-direction predictive relative-displacement equations $g_y(yS_i, yS_j, \Delta S)$ corresponding to the second-direction predictive positioning-points and determines Y-direction measured relative-displacement $\Delta yMy_{i,j}$ according to the Y-direction measured displacements $yMy_1 \sim yMy_{ny}$. Then the method proceeds to step S812.

In step S812, the robotic arm system 40 or the manipulator of the robotic arm system 40 determines whether to perform a Z-direction measurement or not. If yes, the method proceeds to step S813. Otherwise, the method proceeds to step S8017. In step S813, the processing unit 44 of the robotic system 40 controls the posture of the robotic arm 41 so that the measuring instrument 45 faces the Z-direction boundary planes.

In step S814, the processing unit 44 of the robotic arm system 40 controls the robotic arm 41 so that the robotic arm 41 moves toward random distinct third-direction predictive positioning-points $zP_k$ in front of the Z-direction first boundary plane. At this moment, the measuring instrument 45 measures the third-direction predictive positioning-points $zP_k$ in front of the Z-direction first boundary plane to obtain corresponding Z-direction measured displacements $zMz_k$, and the mechanism parameter sets $zS_k$ corresponding to the third-direction predictive positioning-points $zP_k$ are stored.

In step S815, the processing unit 44 of the robotic arm system 40 controls the robotic arm 41 so that the robotic arm 41 moves toward random distinct second-direction predictive positioning-points $zP_k$ in front of the Z-direction second boundary plane. At this moment, the measuring instrument 45 measures the third-direction predictive positioning-points $zP_k$ in front of the Z-direction second boundary plane to obtain corresponding Z-direction measured displacements $yMy_k$, and the mechanism parameter sets $zS_k$ corresponding to the third-direction predictive positioning-points $zP_k$ are stored. In step S816, the processing unit 44 of the robotic arm system 40 obtains third-direction predictive relative-displacement equations $g_z(zS_i, zS_j, \Delta S)$ corresponding to the third-direction predictive positioning-points and determines Z-direction measured relative-displacement $\Delta zMz_{i,j}$ according to the Z-direction measured displacements $zMz_1 \sim zMz_{nz}$. Then the method proceeds to step S817.

In step S817, the processing unit 44 of the robotic arm system 40 calculates an optimization equation $\Phi$ of the robotic arm 41 according to $\Delta xMx_{i,j}$, $\Delta yMy_{i,j}$, $\Delta zMz_{i,j}$, $\Delta zMz_{i,j}$, $g_x(xS_i, xS_j, \Delta S)$, $g_y(yS_i, yS_j, \Delta S)$, $g_z(zS_i, zS_j, \Delta S)$. In step S818, the processing unit 44 of the robotic arm system 40 utilizes an optimization algorithm and the optimization equation $\Phi$ to obtain a set of optimal mechanism parametric deviations $\Delta S$.

Finally, in step S819, the processing unit 44 of the robotic arm system 40 uses the set of optimal mechanism parametric deviations $\Delta S$ to calibrate the mechanism parameter sets $xS_1 \sim xS_{nz}$ corresponding to the first-direction predictive positioning-points $xP_1 \sim xP_{nx}$, the mechanism parameter sets $yS_1 \sim yS_{ny}$ corresponding to the second-direction predictive positioning-points $yP_1 \sim yP_{ny}$, and the mechanism parameter sets $zS_1 \sim zS_{nz}$ corresponding to the third-direction predictive positioning-points $zP_1 \sim zP_{nz}$ of the robotic arm 41.

While the present disclosure has been described by way of example and in terms of preferred embodiment, it is to be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A mechanism-parametric-calibration method for a robotic arm system, wherein the robotic arm system comprises a robotic arm and a measuring instrument, and the mechanism-parametric-calibration method comprises:
   controlling, according to n mechanism parameter sets, the robotic arm performing n actions so that an end of the robotic arm moves toward n corresponding predictive positioning-points;
   determining a predictive relative-displacement equation of each two of the n predictive positioning-points;
   sensing, using the measuring instrument, three-dimensional measured positioning-points corresponding to the end of the robotic arm after the robotic arm performs each of the n actions;
   determining, according to the n three-dimensional measured positioning-points, a measured relative-displacement moved by the end of the robotic arm when the robotic arm performs each two of the n actions;
   deriving an optimization equation corresponding to the robotic arm from the predictive relative-displacement equations and the measured relative-displacements;
   obtaining, by the optimization equation, a set of mechanism parametric deviations of the robotic arm; and
   calibrating, by the set of mechanism parametric deviations, the n mechanism parameter sets of the robotic arm.

2. The mechanism-parametric-calibration method as claimed in claim 1, wherein the optimization equation is $$\Phi = \min_{\Delta S} \sum_{i=1}^{n-1} \sum_{j=i+1}^{n} (\Delta M_{i,j} - G(S_i, S_j, \Delta S))^2;$$

and
   wherein $\Delta M_{i,j}$ is the measured relative-displacement, $G(S_i, S_j, \Delta S)$ is the predictive relative-displacement equation, $S_i$ and $S_j$ are the mechanism parameter sets, and $\Delta S$ is the set of mechanism parametric deviations.

3. A mechanism-parametric-calibration method for a robotic arm system, the robotic arm system comprising a robotic arm, a calibration block and a measuring instrument, wherein the mechanism-parametric-calibration method comprises:
   controlling, according to nx mechanism parameter sets corresponding to nx first-direction predictive positioning-points, the robotic arm performing nx actions such that an end of the robotic arm moves toward the nx first-direction predictive positioning-points which are in front of a first precision plane of the calibration block, wherein the first precision plane is perpendicular to a first direction;
   sensing, using the measuring instrument, a first-direction measured displacement between the first precision plane and the end of the robotic arm when the robotic arm performs each of the nx actions;
   determining, according to the nx first-direction measured displacement, a first-direction measured relative-displacement moved by the end of the robotic arm when the robotic arm performs each two of the nx actions;
   determining a first-direction predictive relative-displacement equation of each two of the nx first-direction predictive positioning-points;
   deriving an optimization equation corresponding to the robotic arm from the first-direction predictive relative-displacement equations and the first-direction measured relative-displacements;
   obtaining, by the optimization equation, a set of mechanism parametric deviations of the robotic arm; and
   calibrating, by the set of mechanism parametric deviations, the nx mechanism parameter sets corresponding to the nx first-direction predictive positioning-points of the robotic arm.

4. The mechanism-parametric-calibration method as claimed in claim 3, further comprising:
   when a first-direction pitch between an out-of-range first-direction predictive positioning-point and the first precision plane exceeds a maximum sensing distance of the measuring instrument in the first direction, controlling the robotic arm so that the end of the robotic arm moves toward the out-of-range first-direction predictive positioning-point which is in front of a second precision plane of the calibration block to sense the first-direction measured displacement between the end of the robotic arm and the second precision plane, wherein the second precision plane is perpendicular to the first direction; and
   determining the first-direction measured relative-displacements according to a first-direction displacement parameter and the first-direction measured displacements, wherein the first precision plane and the second precision plane are the first-direction displacement parameter apart.

5. The mechanism-parametric-calibration method as claimed in claim 3, wherein the optimization equation is $$\Phi = \min_{\Delta S} \sum_{i=1}^{nx-1} \sum_{j=i+1}^{nx} (\Delta xMx_{i,j} - g_x(xS_i, xS_j, \Delta S))^2;$$

and
   wherein $\Delta xMx_{i,j}$ is the first-direction measured relative-displacement, $g_x(xS_i, xS_j, \Delta S)$ is the first-direction predictive relative-displacement equation, $xS_i$, and $xS_j$ are the mechanism parameter sets corresponding to the first-direction predictive positioning-points, and $\Delta S$ is the set of mechanism parametric deviations.

6. The mechanism-parametric-calibration method as claimed in claim 3, further comprising:
   controlling, according to ny mechanism parameter sets corresponding to ny second-direction predictive positioning-points, the robotic arm performing ny actions so that the end of the robotic arm moves toward the ny second-direction predictive positioning-points which are in front of a third precision plane of the calibration block, wherein the third precision plane is perpendicular to a second direction;
sensing, using the measuring instrument, a second-direction measured displacement between the third precision plane and the end of the robotic arm when the robotic arm performs each of the ny actions;
determining, according to the ny second-direction measured displacement, a second-direction measured relative-displacement moved by the end of the robotic arm when the robotic arm performs each two of the ny actions;
determining a second-direction predictive relative-displacement equation of each two of the ny second-direction predictive positioning-points; and
deriving the optimization equation corresponding to the robotic arm from the first-direction predictive relative-displacement equations, the first-direction measured relative-displacements, the second-direction predictive relative-displacement equations and the second-direction measured relative-displacements.

7. The mechanism-parametric-calibration method as claimed in claim 6, wherein the optimization equation is $$\Phi = \min_{\Delta S}\left\{\sum_{i=1}^{nx-1}\sum_{j=i+1}^{nx}(\Delta xMx_{i,j} - g_x(xS_i, xS_j, \Delta S))^2 + \sum_{i=1}^{ny-1}\sum_{j=i+1}^{ny}(\Delta yMy_{i,j} - g_y(yS_i, yS_j, \Delta S))^2\right\};$$

and
wherein $\Delta xMx_{i,j}$ is the first-direction measured relative-displacement, $g_x(xS_i, xS_j, \Delta S)$ is the first-direction predictive relative-displacement equation, $xS_i$ and $xS_j$ are the mechanism parameter sets corresponding to the first-direction predictive positioning-points, $\Delta yMy_{i,j}$ is the second-direction measured relative-displacement, $g_y(yS_i, yS_j, \Delta S)$ is the second-direction predictive relative-displacement equation, $yS_i$ and $yS_j$ are the mechanism parameter sets corresponding to the second-direction predictive positioning-points, and $\Delta S$ is the set of mechanism parametric deviations.

8. The mechanism-parametric-calibration method as claimed in claim 6, further comprising:
when a first-direction pitch between an out-of-range first-direction predictive positioning-point and the first precision plane exceeds the maximum sensing distance of the measuring instrument in the first direction, controlling the robotic arm so that the end of the robotic arm moves toward the out-of-range first-direction predictive positioning-point which is in front of a second precision plane of the calibration block to sense the first-direction measured displacement between the end of the robotic arm and the second precision plane, wherein the second precision plane is perpendicular to the first direction;
when a second-direction pitch between an out-of-range second-direction predictive positioning-point and the third precision plane exceeds the maximum sensing distance of the measuring instrument in the second direction, controlling the robotic arm so that the end of the robotic arm moves toward the out-of-range second-direction predictive positioning-point which is in front of a fourth precision plane of the calibration block to sense the second-direction measured displacement between the end of the robotic arm and the fourth precision plane, wherein the fourth precision plane is perpendicular to the second direction;
determining the first-direction measured relative-displacements according to a first-direction displacement parameter and the first-direction measured displacements; and
determining the second-direction measured relative-displacements according to a second-direction displacement parameter and the second-direction measured displacements, wherein the first precision plane and the second precision plane are the first-direction displacement parameter apart; and
wherein the third precision plane and the fourth precision plane are the second-direction displacement parameter apart.

9. The mechanism-parametric-calibration method as claimed in claim 3, further comprising:
controlling, according to ny mechanism parameter sets corresponding to ny second-direction predictive positioning-points, the robotic arm performing ny actions so the end of the robotic arm moves toward the ny second-direction predictive positioning-points which are in front of a third precision plane of the calibration block, wherein the third precision plane is perpendicular to the second direction;
controlling, according to nz mechanism parameter sets corresponding to nz third-direction predictive positioning-points, the robotic arm performing nz actions so the end of the robotic arm moves toward the nz third-direction predictive positioning-points which are in front of a fifth precision plane of the calibration block, wherein the fifth precision plane is perpendicular to a third direction;
sensing, using the measuring instrument, a second-direction measured displacement between the third precision plane and the end of the robotic arm when the robotic arm performs each of the ny actions;
determining, according to the ny second-direction measured displacements, a second-direction measured relative-displacement moved by the end of the robotic arm when the robotic arm performs each two of the ny actions;
sensing, using the measuring instrument, a third-direction measured displacement between the fifth precision plane and the end of the robotic arm when the robotic arm performs each of the nz actions;
determining, according to the nz third-direction measured displacement, a third-direction measured relative-displacement moved by the end of the robotic arm when the robotic arm performs each two of the nz actions;
determining a second-direction predictive relative-displacement equation of each two of the ny second-direction predictive positioning-points and determining a third-direction predictive relative-displacement equation of each two of the nz third-direction predictive positioning-points; and
deriving the optimization equation corresponding to the robotic arm from the first-direction predictive relative-displacement equations, the first-direction measured relative-displacements, the second-direction predictive relative-displacement equations, the second-direction measured relative-displacements, the third-direction predictive relative-displacement equations and the third-direction measured relative-displacements.

10. The mechanism-parametric-calibration method as claimed in claim 9, wherein the optimization equation is $$\Phi = \min_{\Delta S} \left\{ \sum_{i=1}^{nx-1} \sum_{j=i+1}^{nx} (\Delta xMx_{i,j} - g_x(xS_i, xS_j, \Delta S))^2 + \sum_{i=1}^{ny-1} \sum_{j=i+1}^{ny} (\Delta yMy_{i,j} - g_y(yS_i, yS_j, \Delta S))^2 + \sum_{i=1}^{nz-1} \sum_{j=i+1}^{nz} (\Delta zMz_{i,j} - g_z(zS_i, zS_j, \Delta S))^2 \right\};$$

and
wherein $\Delta xMx_{i,j}$ is the first-direction measured relative-displacement, $g_x(xS_i, xS_j, \Delta S)$ is the first-direction predictive relative-displacement equation, $xS_i$ and $xS_j$ are the mechanism parameter sets corresponding to the first-direction predictive positioning-points, $\Delta yMy_{i,j}$ is the second-direction measured relative-displacement, $g_y(yS_i, yS_j, \Delta S)$ is the second-direction predictive relative-displacement equation, $yS_i$ and $yS_j$ are the mechanism parameter sets corresponding to the second-direction predictive positioning-points, $\Delta zMz_{i,j}$ is the third-direction measured relative-displacement, $g_z(zS_i, zS_j, \Delta S)$ is the third-direction predictive relative-displacement equation, $zS_i$ and $zS_j$ are the mechanism parameter sets corresponding to the third-direction predictive positioning-points, and $\Delta S$ is the set of mechanism parametric deviations.

11. The mechanism-parametric-calibration method as claimed in claim 9, further comprising:
when a first-direction pitch between an out-of-range first-direction predictive positioning-point and the first precision plane exceeds the maximum sensing distance of the measuring instrument in the first direction, controlling the robotic arm so that the end of the robotic arm moves toward the out-of-range first-direction predictive positioning-point which is in front of a second precision plane of the calibration block to sense the first-direction measured displacement between the end of the robotic arm and the second precision plane, wherein the second precision plane is perpendicular to the first direction;
when a second-direction pitch between an out-of-range second-direction predictive positioning-point and the third precision plane exceeds the maximum sensing distance of the measuring instrument in the second direction, controlling the robotic arm so that the end of the robotic arm moves toward the out-of-range second-direction predictive positioning-point which is in front of a fourth precision plane of the calibration block to sense the second-direction measured displacement between the end of the robotic arm and the fourth precision plane, wherein the fourth precision plane is perpendicular to the second direction;
when a third-direction pitch between an out-of-range third-direction predictive positioning-point and the fifth precision plane exceeds the maximum sensing distance of the measuring instrument in the third direction, controlling the robotic arm so that the end of the robotic arm moves toward the out-of-range third-direction predictive positioning-point which is in front of a sixth precision plane of the calibration block to sense the third-direction measured displacement between the end of the robotic arm and the sixth precision plane, wherein the sixth precision plane is perpendicular to the third direction;
determining the first-direction measured relative-displacements according to a first-direction displacement parameter and the first-direction measured displacements; and
determining the second-direction measured relative-displacements according to a second-direction displacement parameter and the second-direction measured displacements; and
determining the third-direction measured relative-displacements according to a third-direction displacement parameter and the third-direction measured displacements, wherein the first precision plane and the second precision plane are the first-direction displacement parameter apart;
wherein the third precision plane and the fourth precision plane are the second-direction displacement parameter apart; and
wherein the fifth precision plane and the sixth precision plane are the third-direction displacement parameter apart.

12. The mechanism-parametric-calibration method as claimed in claim 3, wherein the measuring instrument comprises a measuring instrument used for sensing one-dimensional displacements, a measuring instrument used for sensing two-dimensional displacements, or a measuring instrument used for sensing three-dimensional displacements.

\* \* \* \* \*